United States Patent
Yamamoto et al.

(10) Patent No.: US 7,246,364 B2
(45) Date of Patent: Jul. 17, 2007

(54) OPTICAL PICKUP DEVICE

(75) Inventors: Tatsunori Yamamoto, Hiroshima (JP); Makoto Akinaga, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 595 days.

(21) Appl. No.: 10/686,089

(22) Filed: Oct. 14, 2003

(65) Prior Publication Data

US 2004/0076106 A1    Apr. 22, 2004

(30) Foreign Application Priority Data

Oct. 15, 2002  (JP)  ............. 2002-300802
Dec. 25, 2002  (JP)  ............. 2002-375104

(51) Int. Cl.
   *G11B 7/135*  (2006.01)
(52) U.S. Cl. .............. 720/651; 369/112.1; 369/121
(58) Field of Classification Search ........... 369/112.1; 720/651
   See application file for complete search history.

(56) References Cited

U.S. PATENT DOCUMENTS

| | | | |
|---|---|---|---|
| 2,976,760 A * | 3/1961 | Callahan | ............ 356/21 |
| 3,410,400 A * | 11/1968 | Schurrer et al. | ............ 209/21 |
| 5,031,170 A | 7/1991 | Endoh | |
| 5,109,368 A * | 4/1992 | Ohta et al. | ........... 369/44.14 |
| 5,296,724 A | 3/1994 | Ogata et al. | |
| 5,790,511 A * | 8/1998 | Juso et al. | ............ 720/671 |
| 2003/0218884 A1 * | 11/2003 | Kim | ............ 362/508 |

FOREIGN PATENT DOCUMENTS

| JP | 05-081693 | A | | 4/1993 |
|---|---|---|---|---|
| JP | 06-325401 | | | 11/1994 |
| JP | 07-320293 | | | 12/1995 |
| JP | 09065261 | A | * | 3/1997 |
| JP | 10064106 | A | * | 3/1998 |
| JP | 11-149659 | | | 6/1999 |
| JP | 11232678 | A | * | 8/1999 |
| JP | 11-312322 | A | | 11/1999 |
| JP | 2000-021013 | | | 1/2000 |
| JP | 2001275023 | A | * | 10/2001 |
| JP | 2001-319355 | A | | 11/2001 |
| JP | 2002161335 | A | * | 6/2002 |
| JP | 2002-342945 | A | | 11/2002 |
| JP | 2002-367188 | A | | 12/2002 |
| JP | 2004-206801 | A | | 7/2004 |

* cited by examiner

*Primary Examiner*—Angel Castro
*Assistant Examiner*—Christopher R. Magee
(74) *Attorney, Agent, or Firm*—Morrison & Foerster LLP

(57) ABSTRACT

Light from a light source is led to a condensing lens by a light leading unit and is condensed onto an optical recording medium by the condensing lens. Light reflected from the optical recording medium is led to a light sensing device through a spot adjustment lens facing the light sensing device. Between the spot adjustment lens and the light sensing device, a cylindrical dustproof member is provided. The full periphery of an optical path extending between the spot adjustment lens and the light sensing device is covered with the dustproof member. It can prevent intrusion of a foreign matter such as dusts into the optical path extending between the spot adjustment lens and the light sensing device.

4 Claims, 16 Drawing Sheets

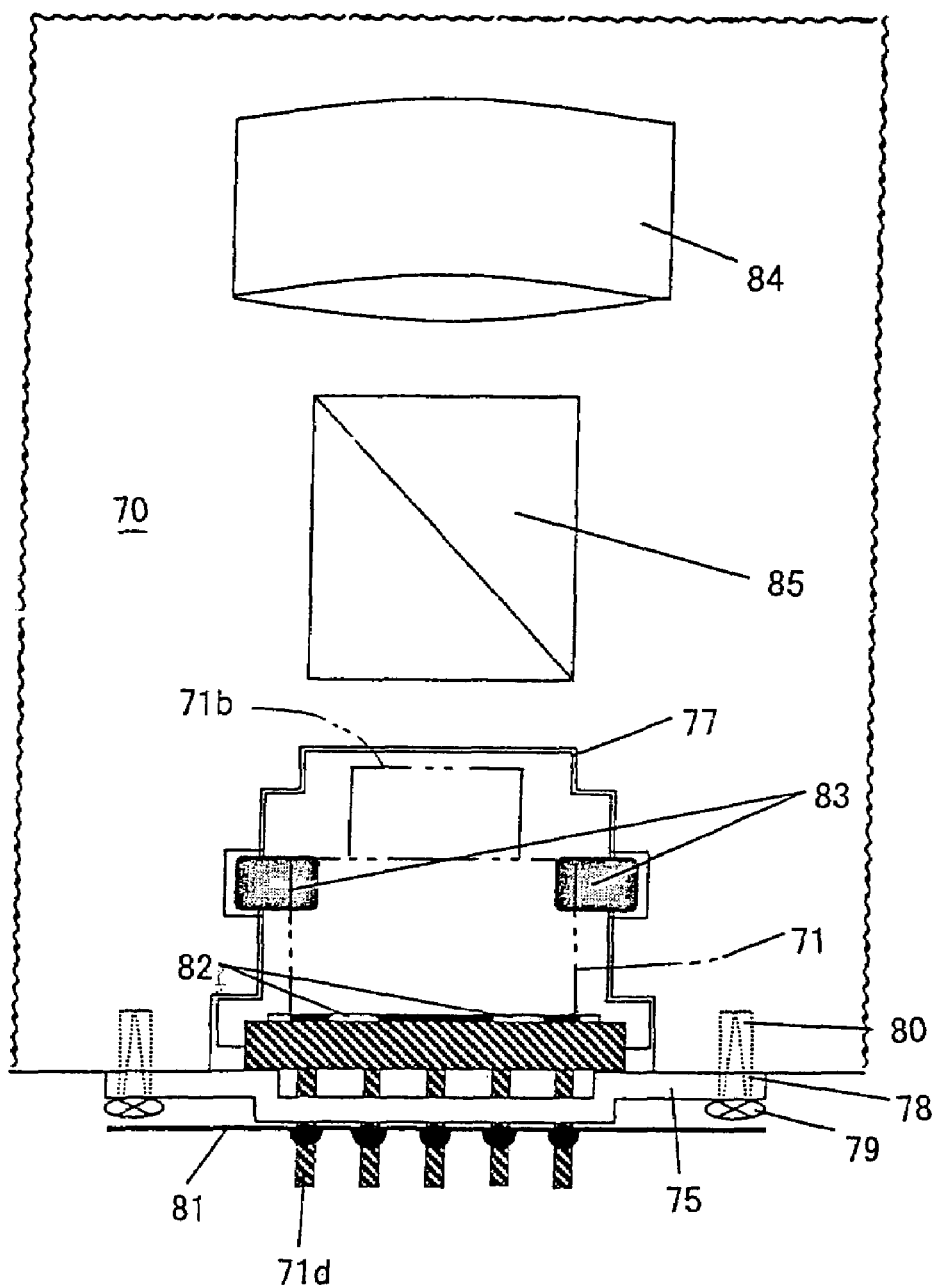
Fig. 18
Prior Art
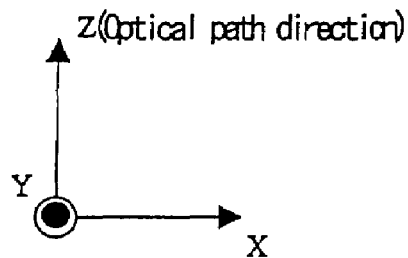

OPTICAL PICKUP DEVICE

CROSS-REFERENCE TO RELATED APPLICATION

This application is related to Japanese application No. 2002-300802 filed on Oct. 15, 2002 and No. 2002-375104 filed on Dec. 25, 2002, whose priority is claimed under 35 USC §119, the disclosure of which is incorporated by reference in its entirety.

BACKGROUND OF THE INVENTION

1. Field of the Invention

The present invention relates to an optical pickup device and, more particularly, to an optical pickup device capable of optically reproducing, recording, or erasing information to/from an optical recording medium such as a CD or DVD.

2. Description of the Background Art

Since a large amount of information can be recorded/reproduced at high density to/from an optical recording medium such as a CD or DVD, the range of uses including an audio-visual system and a computer is very wide. In particular, recently, it is requested to establish, practically use, and spread techniques of recording information to a high-density optical recording medium. Among the techniques, the performance of an optical pickup device used for recording/reproducing information to/from an optical recording medium is being increased. Therefore, it is requested not only to enhance the performance of each of parts of the optical pickup device but also to assure high positional precision of each of the parts so that light travels along a predetermined optical axis (design optical axis).

FIG. 14 is a perspective view showing an optical pickup device 1 of Prior Art 1. FIG. 15 is a perspective view showing a part of a housing 7 in which a light sensing device 5 and an opposed lens (hereinbelow, called a spot adjustment lens 6) in Prior Art 1 are provided. FIG. 16 is a cross section showing a part of the housing 7 in Prior Art 1. FIG. 17 is a perspective view showing a part of the housing 7 before the light sensing device 5 is provided in Prior Art 1. The optical pickup device 1 of Prior Art 1 is constructed by including a light source 2, a condensing lens 3, a light leading part 4, and a light reception part having the light sensing device 5. Light (laser beam) emitted from the light source 2 is condensed onto a not-shown optical recording medium (optical disk) by the condensing lens 3 and reflected by the optical recording medium. The light reflected from the optical recording medium is made converged light by the spot adjustment lens 6 of the light leading part 4 facing the light sensing device 5 and is led to the light sensing device 5. The spot adjustment lens 6 and the light sensing device 5 are provided for the housing 7. An optical path 8 extending between the spot adjustment lens 6 and the light sensing device 5 is open without being surrounded by the housing 7. Also in the other conventional optical pickup devices, although the light leading means is housed in a casing, the optical path extending between a lens opposed to a light sensing device and the light sensing device is open without being surrounded, for example, because of a through hole for leading light to a condensing lens (refer to, for example, Japanese Unexamined Patent Application Nos. 6-309813, 7-320293, and 11-149659).

FIG. 18 is a plan view showing an attachment state of a hologram laser unit in an optical pickup device of Prior Art 2 to a housing (refer to, for example, Japanese Unexamined Patent Application No. 2000-21013). A hologram laser unit 71 is a semiconductor device in which a light outgoing part and a light receiving part are integrated. The optical pickup device is held in a housing 70 in a state where the hologram laser unit (hereinbelow, also called a laser unit) 71, a dichroic prism 85, and a collimator lens 84 are disposed on the same optical axis. The laser unit 71 of the optical pickup device is attached to the housing 70 as follows. First, the laser unit 71 is inserted into a laser holder 77 and is pressed against the housing 70 by a laser press spring 75. By inserting screws 79 to holes 78 formed at both the ends of the laser press spring 75, each of the screws 79 is screwed into a screw hole 80 formed in the housing 70. In an FPC (Flexible Pattern Circuit) 81 in which an operation circuit of the optical pickup device is formed, a plurality of holes are formed and a conduction land exists in the periphery of each of the holes. A plurality of terminals 71d at the ends of the laser unit 71 are inserted into the holes of the FPC 81 and the conduction lands and the terminals 71d are soldered. Subsequently, the positions of the laser unit 71 and the laser holder 77 are adjusted so that information of an optical recording medium can be read accurately. After that, the laser unit 71 and the laser holder 77 are fixed in adhesion positions 82, and the housing 70 and the laser holder 77 are fixed in adhesion positions 83 by an adhesive. In FIG. 18, reference numeral 71b denotes a diffraction device at the tip of the laser unit 77. The arrow X indicates the lateral direction, the painted circle Y expresses the vertical direction, and the arrow Z expresses the optical path direction.

In Prior Art 1, however, the optical path extending between the light sensing device and the spot adjustment lens is in an open state. When a foreign matter such as dusts from the outside enters the optical path as an area where light is converged depending on use environments, light collides with the foreign matter and the travel of the light is deviated from a predetermined optical axis (design optical axis). It causes a problem that the performance of the optical pickup device deteriorates terribly.

In the case of the optical pickup device of Prior Art 2, it is requested to improve the pickup precision by holding the interval between the collimator lens 84 having the role of converting diffusion light emitted from the laser unit 71 into parallel light and the laser unit 71 at high precision. However, the structure of the optical pickup device is insufficient. Specifically, in the case of using the laser holder 77 formed by using a member having strength as high as the housing 70, at the time of assembling the optical pickup device, when the laser unit 71 is attached into the laser holder and the position adjustment is performed in the optical path direction (Z direction), the diffraction device 71b at the tip of the laser unit 71 may come into contact with a wall of the laser holder 77 by mistake and damage the diffraction device. Consequently, it is difficult to attach the laser unit 71 and perform the positional adjustment in the optical path direction. Therefore, it is difficult to make light emitted from the light source of the laser unit 71 toward the optical recording medium and light reflected from the optical recording medium match with a predetermined optical axis (design optical axis) at high precision and to display high-precision optical pickup performance.

As described above, the optical pickup devices of Prior Arts 1 and 2 have a problem such that their high-precision optical pickup performance cannot be displayed due to their structures.

SUMMARY OF THE INVENTION

One of main objects of the invention is to provide an optical pickup device capable of displaying high-precision optical pickup performance by making light emitted from a light outgoing part toward an optical recording medium and light reflected from the optical recording medium travel along a predetermined optical axis.

The invention provides an optical pickup device for recording/reproducing information to/from an optical recording medium, comprising:

a light source for emitting light;

a condensing unit for condensing the light from the light source onto an optical recording medium;

a light receiving unit having a light sensing device for receiving light reflected by the optical recording medium;

a light leading unit having an opposed lens which faces the light sensing device, for leading the light reflected by the optical recording medium to the light sensing device through the opposed lens; and a cylindrical dustproof member for covering the full periphery of an optical path extending between the opposed lens and the light sensing device.

According to the invention, light emitted from the light source is condensed by the light condensing unit onto an optical recording medium. The light reflected by the optical recording medium is received by the light sensing device of the light receiving unit. The light from the optical recording medium is led from the opposed lens to the light sensing device by the light leading unit. The optical path extending between the opposed lens and the light sensing device is provided with the cylindrical dustproof member. With the dustproof member, the full periphery of the optical path extending between the opposed lens and the light sensing device is covered. Since the optical path extending between the opposed lens and the light sensing device is covered with the dustproof member, intrusion of a foreign matter such as dusts can be prevented. Thus, a problem such that light from the opposed lens is scattered by a foreign matter and led to an undesired light reception position of the light sensing device can be solved. Therefore, the performance of the optical pickup device can be held excellently.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 18 is a plan view showing an attachment state of a hologram laser unit in an optical pickup device of Prior Art 2 to a housing.

DESCRIPTION OF THE PREFERRED EMBODIMENTS

Figure 1:
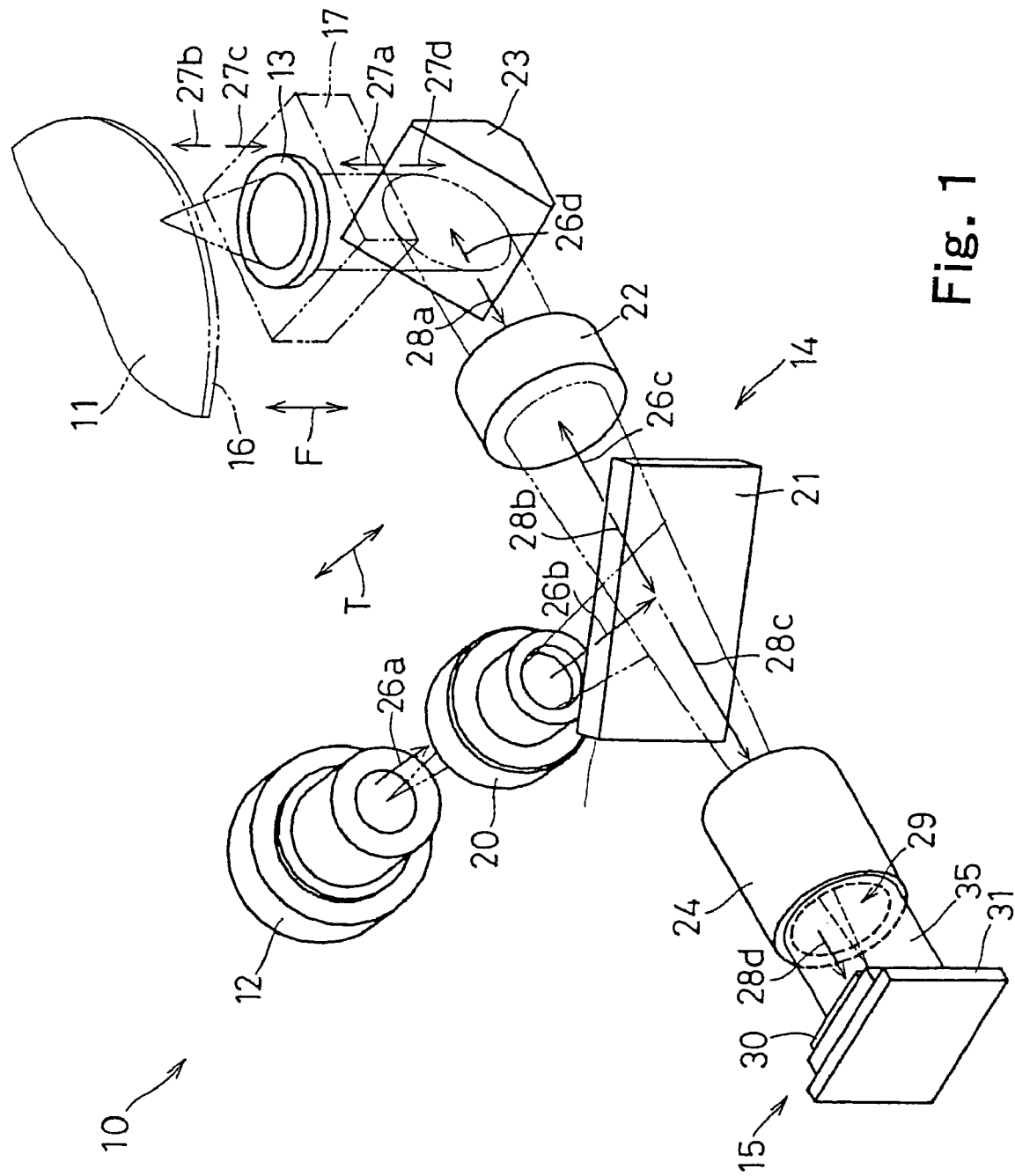
FIG. 1 is a perspective view schematically showing the configuration of an optical pickup device as a first embodiment of the invention.

The invention is also characterized in that the dustproof member is made of an elastic material.

According to the invention, since the dustproof member is made of an elastic material, even in the case where an external force is applied to the dustproof member, the external force can be absorbed. Therefore, the position of the dustproof member can be prevented from being undesirably deviated. A state in which the optical path extending between the opposed lens and the light sensing device is covered can be maintained. In the case of providing the dustproof member for a housing or the like, by providing the housing with a retaining part such as, a through hole and a pair of projection pieces, without using other holding members such as an adhesive, the dustproof member can be easily retained by the retaining part and held by the housing. It can improve workability and prevent increase in the number of parts of the device.

The invention is also characterized in that the full periphery of a one end portion in the axial direction of the dustproof member is in elastic contact with the opposed lens, and the full periphery of the other end portion in the axial direction is in elastic contact with the light sensing device.

According to the invention, the full periphery of a one end portion in the axial direction of the dustproof member is in elastic contact with the opposed lens, and the full periphery of the other end portion in the axial direction is in elastic contact with the light sensing device. With the configuration, even in the case where the opposed lens and the light sensing device are displaced to adjust their positions, the state of contact of the dustproof member with the opposed lens and the light sensing device can be maintained. Therefore, intrusion of a foreign matter to the optical path extending between the opposed lens and the light sensing device can be prevented with reliability.

The invention is also characterized in that the dustproof member expands toward both the ends in the axial direction.

According to the invention, since the dustproof member expands toward both the ends in the axial direction, as compared with a dustproof member whose both the ends in the axial direction are not deformed in the axial direction, the dustproof member can be deformed in the axial direction more easily. Consequently, even in the case where an external force in the axial direction is applied to the dustproof member, the dustproof member is easily deformed in the axial direction, so that the dustproof member can be prevented from exerting an adverse influence on the optical path.

The invention is also characterized in that the dustproof member is formed in a bellows shape.

According to the invention, since the dustproof member is formed in a bellows shape, as compared with a dustproof member of which both the ends in the axial direction are not deformed in the axial direction, the dustproof member can be deformed in the axial direction more easily. Even in the case where an external force in the axial direction is applied to the dustproof member, the dustproof member is easily deformed in the axial direction, so that the dustproof member can be prevented from exerting an adverse influence on the optical path.

The invention is also characterized by further including a housing for holding the light sensing device so as to be rotatable around the reference axis line which is parallel to the optical axis of the opposed lens and so as to be displaceable in the direction perpendicular to the reference axis line, holding the opposed lens so as to be displaceable along the optical axis, and holding the dustproof member so that both the ends in the axial direction are displaceable in the axial direction by the intermediate portion in the axial direction.

According to the invention, the light sensing device is held by the housing so as to be rotatable around the reference axis line which is parallel to the optical axis of the opposed lens and so as to be displaceable in the direction perpendicular to the reference axis line. The opposed lens is held by the housing so as to be displaceable along the optical axis. The dustproof member is held by the housing so that both the ends in the axial direction are displaceable in the axial direction by the intermediate portion in the axial direction. With the configuration, even in the case where the light sensing device and the opposed lens are displaced with respect to the housing as described above, the dustproof member is not easily influenced by the displacement. In other words, even in the case where the light sensing device and the opposed lens are displaced with respect to the housing as described above, the axial layout state of the dustproof member can be maintained. It can prevent a change in the axial layout state of the dustproof member and exertion of an adverse influence on the optical path. Therefore, the dustproof effect can be held with reliability.

The invention is also characterized in that at least the surface of a contact portion which is in contact with the light sensing device, of the dustproof member is formed as a curved surface.

According to the invention, at least the surface of a contact portion which is in contact with the light sensing device, of the dustproof member is formed as a curved surface. As compared with the case where the surface of the contact portion which is in contact with the light sensing device is a plane, the contact area between the dustproof member and the light sensing device can be made smaller. Therefore, an influence exerted by displacement of the light sensing device can be reduced so as not to be easily exerted. For example, in the case of displacing the light sensing device along a virtual plane perpendicular to the optical axis of the opposed lens, as compared with the case of displacing the light sensing device along the optical axis, the dustproof member exerts an influence on the optical path due to a displacement of the light sensing device more easily. By forming the surface of the contact portion which is in contact with the light sensing device, of the dustproof member as a curved surface, an influence exerted on the optical path due to displacement of the light sensing device can be reduced with reliability. The dustproof member can be also prevented from damaging the light sensing device.

The invention is also characterized in that at least the inner peripheral face of the dustproof member is black.

According to the invention, at least the inner peripheral face of the dustproof member is black, so that light can be prevented from being irregularly reflected by the inner peripheral face of the dustproof member. Consequently, stray light generated by irregular reflection can be reliably prevented from being received by the light sensing device.

The invention also provides an optical pickup device comprising: a housing; an optical part which is attached to the housing and includes a light source for emitting a laser beam and/or a light sensing device capable of detecting the laser beam; and an attaching means which is provided in an optical part attaching position in the housing and can attach the optical part directly to the housing, wherein the attaching means has an elastic buffer for protecting the light source and/or the light sensing device of the optical part at the time of attaching the optical part to the housing and adjusting the position of the optical part in an optical path length direction.

Examples of an information recording medium as an object of the optical pickup device of the invention are optical disks such as LD, CD, CD-ROM, DVD-ROM, CD-R, DVD-R, CD-RW, DVD-RW, DVD+R, DVD+RW, and DVD-RAM and magneto-optic disks such as MO and MD. Particularly, the optical pickup device of the invention can be suitably used for writable DVD-R, DVD-RW, DVD+R, DVD+RW, DVD-RAM, and the like requiring high precision in attachment of an optical part.

In the invention, examples of the optical part to be attached to the housing and having the light source for emitting a laser beam and/or the light sensing device capable of detecting the laser beam are a hologram laser unit, a semiconductor laser, and a light sensing device. Particularly, a hologram laser unit requiring the highest precision in adjustment of distance to a collimator lens (position adjustment in the optical path direction) is suitable.

Hereinbelow, when simply called an optical part, it refers to an optical part having a light source for emitting a laser beam and/or a light sensing device capable of detecting the laser beam, such as a hologram laser unit, a semiconductor laser, and a light sensing device.

According to the invention, at the time of attaching an optical part such as a hologram laser unit, a semiconductor laser, a light sensing device, or the like to a housing, by providing the elastic buffer in the attachment position, the light source and/or the light sensing device of the optical part are/is protected by the elastic buffer. The light source and/or the light sensing device can be prevented from coming into contact with the wall of the housing made of metal or plastic having a certain degree of strength and from being damaged.

As described above, since the optical part is protected by the elastic buffer, the breakage ratio largely decreases, the laser holder which is conventionally necessary becomes unnecessary, a manufacturing process and the number of parts of a laser holder which is not easily processed can be reduced, and attachment of the laser holder to the housing and the positional adjustment which are conventionally performed are not performed. Thus, the manufacturing cost is largely reduced and the assembly workability improves.

The adjustment space in the optical path length direction is assured by the elastic buffer, so that the optical part can be (slightly) moved in the optical path length direction by elastic deformation of the elastic buffer at the time of adjusting the position of the optical part in the optical path length direction, and the positional adjustment can be performed easily at high precision. Therefore, the precision of a laser beam (diffusion light) emitted to the collimator lens and/or precision of a laser beam (focused beam) from the collimator lens is improved, and information can be recorded/reproduced to/from a high-density optical device medium more reliably.

In the invention, as the material of the elastic buffer, a sponge made of a natural sea sponge, a synthetic resin or a rubber is used. In the elastic buffer, a laser beam passing window for passing a laser beam is formed in a position facing the light source and/or the light sensing device of the optical part. By forming the elastic buffer in a shape covering the light sourse and/or the light sensing device of the optical part, the dustproof function and the light shielding function can be added. To increase the light shielding performance, the color of the elastic buffer is preferably black.

In the invention, when the housing has a recessed portion for inserting and attaching the optical part in the horizontal optical path direction and has a structure that the elastic buffer is disposed along the wall face in the deep portion of the recessed portion, the recessed portion serves as a storage space capable of housing the whole optical part so as to protect it. At the time of inserting the optical part into the recessed portion, the elastic buffer can protect the optical part so that the light source and/or the light sensing device does/do not come into contact with the wall face in the deep portion.

As a component of the attaching means, a projection to which an adhesive for fixing the elastic buffer is to be applied may be provided for the recessed portion. With the configuration, the elastic buffer can be easily attached at a proper level.

In the invention, the recessed portion of the attaching means have a temporary holding portion so that the optical part is temporarily held in a state where movement in the vertical direction is regulated. In the invention, the temporary holding portion may have a structure formed on an inner face of the recessed portion and sandwiching the optical part inserted in the recessed portion from top and bottom, for example, a structure constructed by a pair of upper and lower projection pieces which project to the inside from a left inner face and a pair of upper and lower projection pieces which project to the inside from a right inner face toward an opening of the recessed portion which is open in the horizontal direction. In such a manner, the temporary holding portion may have a simple structure. By the temporary holding portion, the optical part inserted in the recessed portion is temporarily held at a level corresponding to the design optical axis and is in parallel. In the invention, "temporary holding" is defined as holding of the optical part so as to be movable in at least the optical path length direction. In the case where the width (in the horizontal direction) of the recessed portion is set to be larger than the width of the optical part, the optical part is temporarily held by the temporary holding portion so as to be movable in the optical path length direction and the horizontal direction, so that position adjustment in two directions is performed. Further, the temporary holding portion can also serve as a portion to which an adhesive for fixing the optical part sandwiched from top and bottom is applied, so that it is convenient.

Embodiments of the invention will be described hereinbelow with reference to the drawings. The invention, however, is not limited to the embodiments.

FIRST EMBODIMENT

FIG. 1 is a perspective view schematically showing the configuration of an optical pickup device 10 as a first embodiment of the invention. In FIG. 1, for easier understanding, an optical path is shown in a simplified manner. An optical pickup device 10 is a device for recording/reproducing information to/from an optical recording medium 11. The optical recording medium 11 is an optical disk such as a compact disc (abbreviated as CD), a digital versatile disc (abbreviated as DVD), or the like. The optical pickup device 10 is constructed by including a light source 12, a condensing lens 13, a light leading means 14, and a light sensing device 15.

The light source 12 is means for emitting light and is realized by, for example, a semiconductor laser. The condensing lens 13 as light condensing means condenses light from the light source 12 onto an information recording face 16 of the optical recording medium 11. The condensing lens 13 is held by a lens holder 17. The lens holder 17 is held by a not-shown holder so as to be displaced in a focusing direction F and a tracking direction T. The focusing direction F is a direction toward/apart from the information recording face 16 of the optical recording medium 11. The tracking direction T is a direction of scanning a recording area in the information recording face 16 of the optical recording medium 11. The lens holder 17 is displaced in the focusing direction F and the tracking direction T by a magnetic action of driving means (not shown) realized by, for example, a coil and a permanent magnet piece. The condensing lens 13 is displaced in the focusing direction F and the tracking direction T and light from the condensing lens 13 forms a small spot on the information recording face 16.

The light leading means 14 leads light emitted from the light source 12 to the optical recording medium 11 and leads light reflected from the optical recording medium 11 to the light sensing unit 15 which will be described later. The light leading means 14 is constructed by including a grating lens 20, a beam splitter 21, a collimator lens 22, a reflection mirror 23, and a spot adjustment lens 24. The grating lens 20 has a diffraction grating and divides incident light into a plurality of rays. When a light beam which is linear polarized in an arbitrary direction enters, the beam splitter 21 splits the linear polarized light beam into a P-direction component and an S-direction component, transmits the P-direction component, and reflects the S-direction component at 90 degrees. The beam splitter 21 is formed in a flat plate shape or a rectangular parallelepiped shape. In the example of FIG. 1, the beam splitter 21 has a flat plate shape. The collimator lens 22 converts incident light into parallel light. The reflection mirror 23 reflects the led light to change the travel direction of the light. The spot adjustment lens 24 as an opposed lens is a lens for condensing the light and faces a light sensing device 30 which will be described later. The spot adjustment lens 24 has, for example, a cylindrical body 24a and a lens 24b for condensing light and has a configuration that the cylindrical body 24a and the lens 24b are integrally displaced along an optical axis L24 of the lens 24b.

The light source 12, grating lens 20, and beam splitter 21 are disposed in this order at intervals in a direction perpendicular to a virtual plane in which a plurality of gratings are arranged in the grating lens 20. In the example of FIG. 1, the direction perpendicular to the virtual plane is parallel to the tracking direction T. The spot adjustment lens 24, beam splitter 21, collimator lens 22, and reflection mirror 23 are disposed in this order at intervals in the focusing direction F and the above-described direction. The collimator lens 22 is disposed on the same side as the grating lens 20 with respect to the beam splitter 21. The condensing lens 13 and the reflection mirror 23 are disposed with a space in the focusing direction F. Further, the condensing lens 13 is disposed between the optical recording medium 11 and the reflection mirror 23.

When light is emitted from the light source 12 as shown by an arrow 26a in FIG. 1, the light from the light source 12 enters the grating lens 20. The light entered and passed through the grating lens 20 is split into a plurality of light beams, which are led as shown by an arrow 26b in FIG. 1 and are incident on the beam splitter 21. The beam splitter 21 reflects the light from the grating lens 20 only by 90 degrees. The light reflected by the beam splitter 21 is led as shown by an arrow 26c of FIG. 1 and is incident on the collimator lens 22. The light incident on the collimator lens 22 is converted by the collimator lens 22 to parallel light. The parallel light is led to the reflection mirror 23 as shown by an arrow 26d of FIG. 1. The light from the collimator lens 22 is reflected by the reflection mirror 23 so as to become parallel to the focusing direction F. The light reflected by the reflection mirror 23 is led as shown by an arrow 27a of FIG. 1 and is incident on the condensing lens 13. The light incident on the condensing lens 13 is led as shown by an arrow 27b of FIG. 1 and is condensed onto the information recording face 16 of the optical recording medium 11. The light reflected from the optical recording medium 11 is led as shown by an arrow 27c of FIG. 1 and is incident on the condensing lens 13. The light incident on the condensing lens 13 from the optical recording medium 11 is led as shown by an arrow 27d of FIG. 1 and is led to the reflection mirror 23. The light from the condensing lens 13 is reflected by the reflection mirror 23, led as shown by an arrow 28a of FIG. 1, and enters the collimator lens 22. The light entered the collimator lens 22 from the reflection mirror 23 is led as shown by an arrow 28b of FIG. 1 and is incident on the beam splitter 21. The light incident on the beam splitter 21 passes through the beam splitter 21, is led as shown by an arrow 28c of FIG. 1 and enters the spot adjustment lens 24. The light incident on the spot adjustment lens 24 is converted by the spot adjustment lens 24 to converged light which is led as shown by an arrow 28d of FIG. 1 and received by the light sensing means 15 which will be described below.

The light sensing means 15 has the light sensing device 30 and receives the light reflected from the optical recording medium 11 by the light sensing device 30. The light sensing means 15 has a base portion 31 having a flat plate shape and the light sensing device 30 is provided on the base portion 31. The light sensing device 30 is realized by, for example, a photo diode. The light sensing device 30 receives light led from the spot adjustment lens 24 by a light receiving portion 30a (refer to FIG. 4). The light sensing device 30 converts the light into an electric signal on the basis of the amount of the received light. The electric signal includes an information signal regarding the information recording face 16 and a servo signal for controlling a displacement in the focusing direction F and the tracking direction T. On the basis of the information signal and the servo signal, driving means and the like are controlled by not-shown control means so that the light is condensed to a desired position in the information recording face 16. In such a manner, the optical pickup device 10 records/reproduces information to/from the optical recording medium 11.

Figure 2:
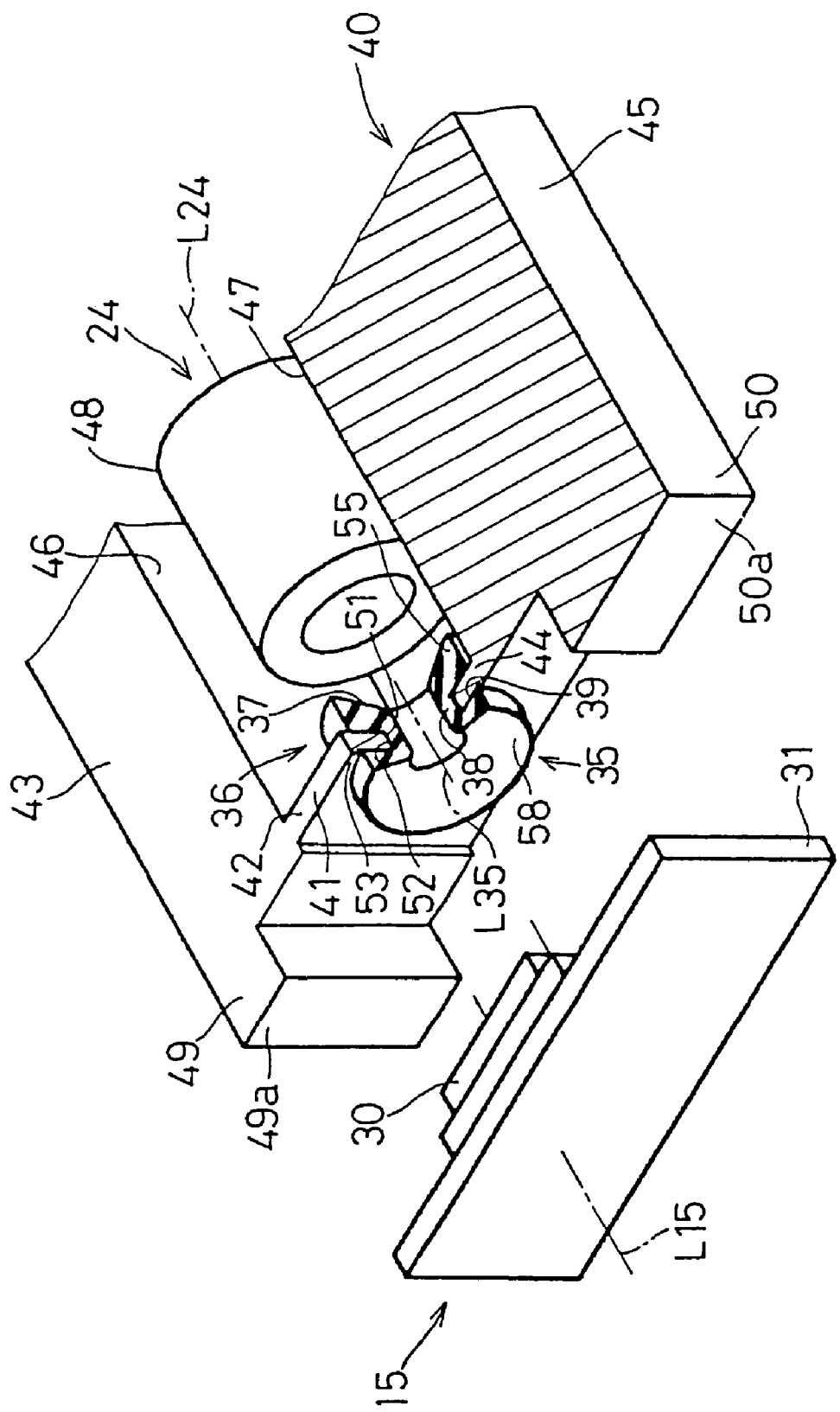
FIG. 2 is an exploded perspective view in which a dustproof member and a housing are partially cut away.
Figure 3:
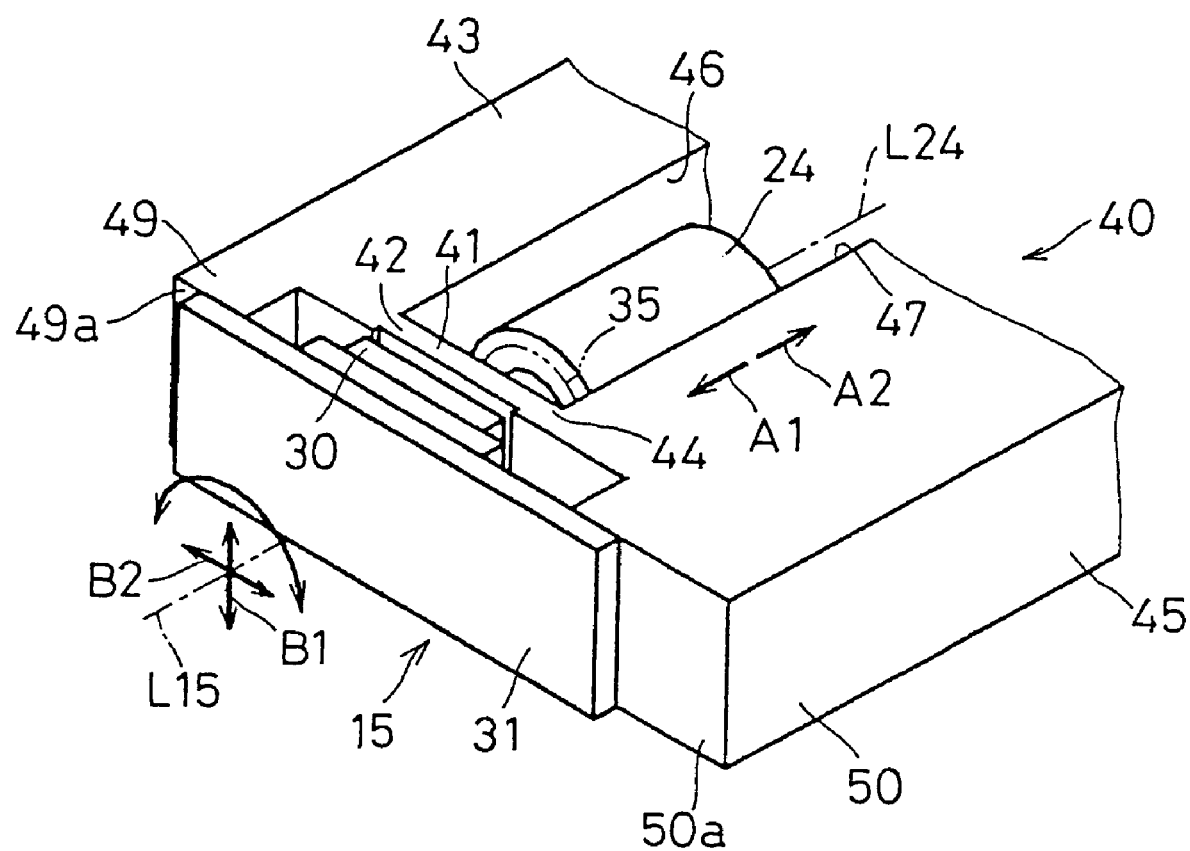
FIG. 3 is a perspective view showing a part of the housing in a state where the light sensing means, the spot adjustment lens and the dustproof member are provided.
Figure 4:
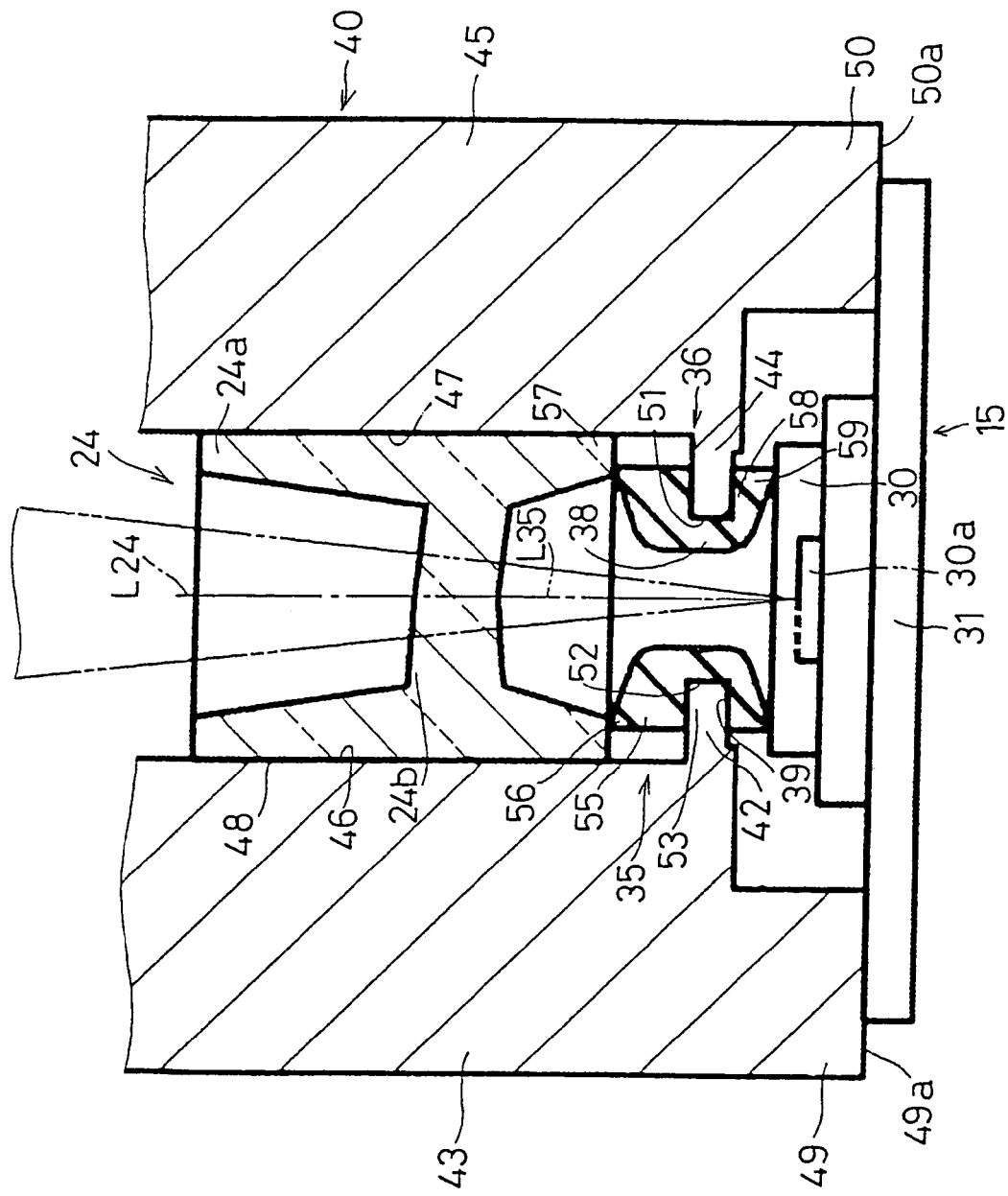
FIG. 4 is a cross section showing a part of the housing in a state where the light sensing means, the spot adjustment lens, and the dustproof member are provided.

FIG. 2 is an exploded perspective view in which a dustproof member 35 and a housing 40 are partially cut away. FIG. 3 is a perspective view showing a part of the housing 40 in a state where the light sensing means 15, the spot adjustment lens 24 and the dustproof member 35 are provided. FIG. 4 is a cross section showing a part of the housing 40 in a state where the light sensing means 15, the spot adjustment lens 24, and the dustproof member 35 are provided. In FIGS. 2 to 4, for easier understanding, the optical path is shown in a simplified manner. Between the spot adjustment lens 24 and the light sensing device 30, the dustproof member 35 having a cylindrical shape is disposed. The dustproof member 35 is a member for covering the full periphery of an optical path 29 extending between the spot adjustment lens 24 and the light sensing device 30 ("the optical path 29 extending between the spot adjustment lens 24 and the light sensing device 30" will be also simply called "optical path 29"). The dustproof member 35 is made of an elastic material. Examples of the elastic material are a rubber elastic member called elastomer and silicone rubber. The dustproof member 35 is formed so as to expand toward both the ends 36 in the axial direction. Concretely, the dustproof member 35 has an outer shape of, roughly, a right circular cylinder and is formed so that its inner peripheral face 37 expands toward both the ends 36 in the axial direction. At least the inner peripheral face 37 of the dustproof member 35 is black. In the embodiment, the whole dustproof member 35 is black.

The optical pickup device 10 further includes the housing 40. The housing 40 holds the light source 12, light leading unit 14, light sensing device 30, and dustproof member 35. The examples of FIGS. 3 and 4 show a state where the spot adjustment lens 24, the light sensing device 30, and the dustproof member 35 are held by the housing 40. The spot adjustment lens 24 and the light sensing device 30 are disposed in positions so as to face each other and provided for the housing 40. In the housing 40, to enhance the strength, a plate-shaped partition wall 41 of which thickness direction is perpendicular to the optical axis L24 of the spot adjustment lens 24 is provided between the spot adjustment lens 24 and the light sensing device 30.

In one of side ends 42 in the longitudinal direction of the partition wall 41, a first side portion 43 extending in one direction in the thickness direction is provided. In the other side end 44 in the longitudinal direction of the partition wall 41, a second side portion 45 extending in one direction of the thickness direction is provided. The first side portion 43 has a first surface 46 facing the second side portion 45 and perpendicular to the longitudinal direction of the partition wall 41. The second side portion 45 has a second surface 47 facing the first side portion 43 and perpendicular to the longitudinal direction of the partition wall 41. The interval between the first surface 46 and the second surface 47 is almost the same as the outside diameter of the spot adjustment lens 24. The spot adjustment lens 24 is disposed in an area sandwiched by the first side portion 43 and the second side portion 45. A part of the area of the outer peripheral face 48 of the spot adjustment lens 24 is in contact with the first surface 46 of the first side portion 43 and another part of the area of the outer peripheral face 48 is in contact with the second surface 47 of the second side portion 45. The spot adjustment lens 24 is held in the housing 40 so as to be displaceable in a first lens adjustment direction A1 and a second lens adjustment direction A2. The first lens adjustment direction A1 is a direction along the optical axis L24 of the spot adjustment lens 24 and is a direction in which the spot adjustment lens 24 approaches the light sensing device 30. The second lens adjustment direction A2 is a direction along the optical axis L24 of the spot adjustment lens 24 and is a direction in which the spot adjustment lens 24 moves apart from the light sensing device 30. The spot adjustment lens 24 is displaced in the first and second lens adjustment directions A1 and A2 by, for example, a means for displacing the spot adjustment lens 24 so that light is condensed to a small spot to form an image on the light sensing device 30. In the embodiment, the thickness direction of the partition wall 41 is parallel to the optical axis L24 of the spot adjustment lens 24 held by the housing 40.

The first side portion 43 has a first projected portion 49 which projects in the other direction of the thickness direction of the partition wall 41 (first lens adjustment direction A1). The second side portion 45 has a second projected portion 50 which projects in the other direction of the thickness direction of the partition wall 41 (second lens adjustment direction A1). The first and second projected portions 49 and 50 project to a degree that, at the time of providing the light sensing device 30 for the housing 40, the dustproof member 35 can be pressed by the light sensing device 30 so as to be deformed. The first projected portion 49 has a surface 49a serving as a plane perpendicular to the thickness direction of the partition wall 41, and the second projected portion 50 has a surface 50a serving as a plane perpendicular to the thickness direction of the partition wall 41. The surface 49a of the first projected portion 49 and the surface 50a of the second projected portion 50 are included in a virtual plane perpendicular to the thickness direction of the partition wall 41.

The base portion 31 of the light sensing means 15 is in contact with the surface 49a of the first projected portion 49 and the surface 50a of the second projected portion 50 in the light sensing device 30. The light sensing device 30 is held by the housing 40 so as to be displaceable along the virtual plane including the surface 49a of the first projected portion 49 and the surface 50a of the second projected portion 50. Concretely, the light sensing device 30 is held by the housing 40 so as to be rotatable around a reference axis line L15 and displaceably in a first adjustment direction B1 and a second adjustment direction B2 as directions perpendicular to the reference axial line L15. The first and second adjustment directions B1 and B2 are perpendicular to each other. The reference axis line L15 is, concretely, an axis parallel to the optical axis L24 of the spot adjustment lens 24 held in the housing 40. The first adjustment direction B1 is, for example, a direction parallel to the focusing direction F and the second adjustment direction B2 is, for example, a direction parallel to the tracking direction T. As described above, the light sensing device 30 is displaced in a range where its light receiving portion 30a can receive light from the spot adjustment lens 24 and receives light from the spot adjustment lens 24. The light sensing device 30 is displaced by, for example, means for displacing the light sensing device 30.

In the partition wall 41, a through hole 51 is opened so as to penetrate the partition wall 41 in the thickness direction. The inner peripheral face 52 facing the through hole 51 of the partition wall 41 is smaller as compared with the outside diameter of the dustproof member 35 and has a diameter of a degree that light from the spot adjustment lens 24 can be led to the light sensing device 30 in a state where the dustproof member 35 is inserted in the through hole 51. The dustproof member 35 is inserted in the through hole 51 and is provided for the partition wall 41. In an intermediate portion 38 in the axial direction of the dustproof member 35, a recessed portion 39 which is a partial area recessed toward the inner radius in the whole circumferential direction is provided. The recessed portion 39 is provided in the intermediate portion 38 in the axial direction of the dustproof member 35 near to the other end portion 58. The other end portion 58 of the dustproof member 35 is an end on the other side (the light sensing device 30 side) in the axial direction in both the ends 36 in the axial direction of the dustproof member 35. At the time of providing the dustproof member 35 for the partition wall 41, an inner peripheral portion 53 having an inner peripheral face 52 of the partition wall 41 is fit in the recessed portion 39 of the intermediate portion 38 in the axial direction. In a state where the dustproof member 35 is provided for the partition wall 41, the dustproof member 35 is disposed so that its axial direction is parallel to the thickness direction of the partition wall 41. At the time of inserting the dustproof member 35 in the through hole 51, since the dustproof member 35 is made of an elastic material, even in the case where the outside diameter of the dustproof member 35 is larger than the diameter of the through hole 51, the dustproof member 35 can be deformed and easily inserted in the through hole 51.

Further, after the dustproof member 35 is provided for the housing 40, the inner peripheral portion 53 of the partition wall 41 is fit in the recessed portion 39 of the intermediate portion 38 in the axial direction of the dustproof member 35 and is disposed near to the other end 58 with respect to the dustproof member 35. In a state where the dustproof member 35 is provided for the partition wall 41, the intermediate portion 38 in the axial direction of the dustproof member 35 comes into elastic contact with the inner peripheral portion 53 of the partition wall 41. By providing the dustproof member 35 for the partition wall 41, even in the case where the spot adjustment lens 24 is displaced in the first lens adjustment direction A1, the spot adjustment lens 24 is prevented from being disengaged from the partition wall 41 and only one end portion 55 of the dustproof member 35 is deformed. In such a manner, the dustproof member 35 is held by the housing 40 so that both the ends 36 in the axial direction are displaceable in the axial direction in the intermediate portion 38 in the axial direction. At the time of providing the dustproof member 35 for the housing 40, it is unnecessary to use other holding members such as an adhesive, the number of parts of the device can be prevented from increasing.

The spot adjustment lens 24 is provided for the housing 40 so as to face the one end portion 55 of the dustproof member 35. In a state where the spot adjustment lens 24 and the dustproof member 35 are provided for the housing 40, an axis L35 of the dustproof member 35 is coaxial with the optical axis L24 of the spot adjustment lens 24. The one end portion 55 of the dustproof member 35 is the end portion on one side (spot adjustment lens 24 side) out of both the end portions 36 in the axial direction of the dustproof member 35. The spot adjustment lens 24 is held by the housing 40 in a state where the one end portion 55 of the dustproof member 35 is pressed and deformed in the first lens adjustment direction A1. In the one end portion 55 of the dustproof member 35, the full periphery of a lens contact portion 56 is in elastic contact with the spot adjustment lens 24. Concretely, the lens contact portion 56 is in elastic contact with the full periphery of a one end portion 57 in the axial direction facing the dustproof member 35 of the cylindrical body 24a of the spot adjustment lens 24. The inside diameter of the lens contact portion 56 is larger than that of the one end portion 57 in the axial direction of the cylindrical body 24a of the spot adjustment lens 24.

When the spot adjustment lens 24 is displaced in the first lens adjustment direction A1, the lens contact portion 56 of the dustproof member 35 is pressed and deformed in the axial direction. When the spot adjustment lens 24 is displaced in the second lens adjustment direction A2, the lens contact portion 56 of the dustproof member 35 is deformed in the axial direction so as to be reset to a natural state again in which an external force is not applied. Since the dustproof member 35 is made of an elastic material, the lens contact portion 56 is deformed as the spot adjustment lens 24 is displaced. Further, since the inner peripheral face 37 of the dustproof member 35 expands towards both the ends 36 in the axial direction, the dustproof member 35 is not deformed in the axial direction. However, the one end portion 55 of the dustproof member 35 is deformed more easily as compared with a dustproof member having, for example, a right cylindrical shape. Since the one end portion 55 of the dustproof member 35 is deformed as the spot adjustment lens 24 is displaced, the state of contact between the dustproof member 35 and the spot adjustment lens 24 is maintained.

The light sensing device 30 is disposed so as to face the other end portion 58 of the dustproof member 35. The light sensing device 30 is held by the housing 40 in a state where it presses against the other end portion 58 of the dustproof member 35 in the axial direction and the other end portion 58 is deformed. At the time of pressing the light sensing device 30 against the dustproof member 35, since the dustproof member 35 expands towards both the ends 36 in the axial direction, for example, as compared with a dustproof member having a right circular cylinder shape, the other end portion 58 of the dustproof member 35 can be deformed in the axial direction more easily. Further, since the other end portion 58 of the dustproof member 35 expands toward the other end portion 58, even in the case where the light sensing device 30 is pressed against the other end portion 58 of the dustproof member 35 and the other end portion 58 is deformed, the optical path 29 can be prevented from being interrupted due to deformation of the inner peripheral face of the other end portion 58. In the other end portion 58 of the dustproof member 35, the full periphery of a device contact portion 59 which is in elastic contact with the light sensing device 30 is in elastic contact with the light sensing device 30.

When the light sensing device 30 is allowed to rotate around the reference axis line L15 or is displaced in the first adjustment direction B1 and the second adjustment direction B2, the contact area with the light sensing device 30 of the dustproof member 35 becomes smaller as compared with, for example, that of a dustproof member having a right circular cylinder shape. As compared with a dustproof member having a right circular cylinder shape, the other end portion 58 of the dustproof member 35 does not easily rotate around the reference axis line L15 and is not easily deformed in the first and second adjustment directions B1 and B2. Therefore, the state of contact between the dustproof member 35 and the light sensing device 30 is maintained, thereby enabling an adverse influence exerted by intrusion of a foreign matter such as dusts to the optical path 29 to be prevented. As described above, light from the spot adjustment lens 24 passes through the area surrounded by the dustproof member 35 and is received by the light sensing device 30 with reliability.

To assure the performance of the optical pickup device 10, it is a big issue how to prevent intrusion of a foreign matter such as dusts into an optical path initially or in accordance with environments in which the device is used. Initially, the quality can be assured by improving the manufacture environment of the optical pickup device 10. However, depending on the state of environments in which the device is used, a foreign matter may intrude in an optical path. It may cause a problem such that information cannot be excellently recorded/reproduced to/from the optical recording medium 11, and the performance of the optical pickup device 10 deteriorates sharply. Particularly, the optical path 29 extending between the spot adjustment lens 24 and the light sensing device 30 is an area where light is converged, so that the optical path 29 is easily influenced by being interrupted by a foreign matter such as dusts. Since the optical path 29 is reliably protected from the outside by being covered with the dustproof member 35 as described above, the optical path 29 can be kept in a hermetic state under any environment.

According to the embodiment, light emitted from the light source 12 is condensed onto the optical recording medium 11 by the condensing lens 13. The light reflected from the optical recording medium 11 is received by the light sensing device 30 of the light sensing means 15. The light from the optical recording medium 11 is led from the spot adjustment lens 24 to the light sensing device 30 by the light leading unit 14. The optical path 29 extending between the spot adjustment lens 24 and the light sensing device 30 is provided with the cylindrical-shaped dustproof member 35. By the dustproof member 35, the full periphery of the optical path 29 extending between the spot adjustment lens 24 and the light sensing device 30 is covered. Since the optical path 29 is covered with the dustproof member 35, intrusion of a foreign matter such as dusts can be prevented. It can solve the problem such that light from the spot adjustment lens 24 is scattered by a foreign matter and led to an undesired light reception position of the light sensing device 30. Therefore, the performance of the optical pickup device 10 can be held preferably.

Further, according to the embodiment, the dustproof member 35 is made of an elastic material. Consequently, even if an external force is applied to the dustproof member 35, the external force can be absorbed and the position in which the dustproof member 35 is disposed can be prevented from being undesirably deviated. Thus, the state in which the optical path 29 is covered can be maintained.

Further, in the case of providing the dustproof member 35 for the housing 40 or the like, by providing the through hole 51 and a retaining member such as a pair of projection pieces for the housing 40 for example, without using another holding member such as an adhesive, the dustproof member 35 can be easily provided for the retaining member and held by the housing 40. Consequently, the workability can be improved and the number of parts of the device can be prevented from increasing.

Further, according to the embodiment, the full periphery of the one end portion 55 of the dustproof member 35 is elastically in contact with the spot adjustment lens 24, and the full periphery of the other end portion 58 of the dustproof member 35 is elastically in contact with the light sensing device 30. Consequently, even in the case where the position is adjusted by displacing the spot adjustment lens 24 and the light sensing device 30, the state of contact with the spot adjustment lens 24 and the light sensing device 30, of the dustproof member 35 can be maintained. Therefore, intrusion of a foreign matter to the optical path 29 extending between the spot adjustment lens 24 and the light sensing device 30 can be prevented with reliability.

Further, according to the embodiment, the dustproof member 35 expands towards both the ends 36 in the axial direction, so that the dustproof member 35 can be deformed in the axial direction more easily as compared with a dustproof member whose both the ends 36 in the axial direction are not deformed in the axial direction. With the configuration, for example, even in the case where the spot adjustment lens 24 and the light sensing device 30 are displaced in the axial direction, both the ends 36 in the axial direction of the dustproof member 35 are deformed in the axial direction, so that occurrence of a problem such that the dustproof member 35 interrupts the optical path can be prevented.

Further, according to the embodiment, the light sensing device 30 is held by the housing 40 so as to be rotatable around the reference axis line L15 parallel to the optical axis L24 of the spot adjustment lens 24 and displaceable in the first adjustment direction B1 and the second adjustment direction B2 perpendicular to the reference axis line L15. The spot adjustment lens 24 is held by the housing 40 so as to be displaceable along the optical axis L24. The dustproof member 35 is held by the housing 40 so that both the ends 36 in the axial direction are displaceable in the axial direction in the intermediate portion 38 in the axial direction. With the configuration, even in the case where the light sensing device 30 and the spot adjustment lens 24 are displaced with respect to the housing 40, the dustproof member 35 is not easily influenced by the displacement. In other words, even in the case where the light sensing device 30 and the spot adjustment lens 24 are displaced with respect to the housing 40, the axial layout state of the dustproof member 35 can be maintained. It prevents a change in the axial layout state of the dustproof member 35 and exertion of an adverse influence on the optical path. Therefore, the dustproof effect can be held with reliability.

Further, according to the embodiment, at least the inner peripheral face 37 of the dustproof member 35 is black, so that light can be prevented from being irregularly reflected by the inner peripheral face 37 of the dustproof member 35. Consequently, stray light generated by irregular reflection can be reliably prevented from being received by the light sensing device 30.

SECOND EMBODIMENT

Figure 5:
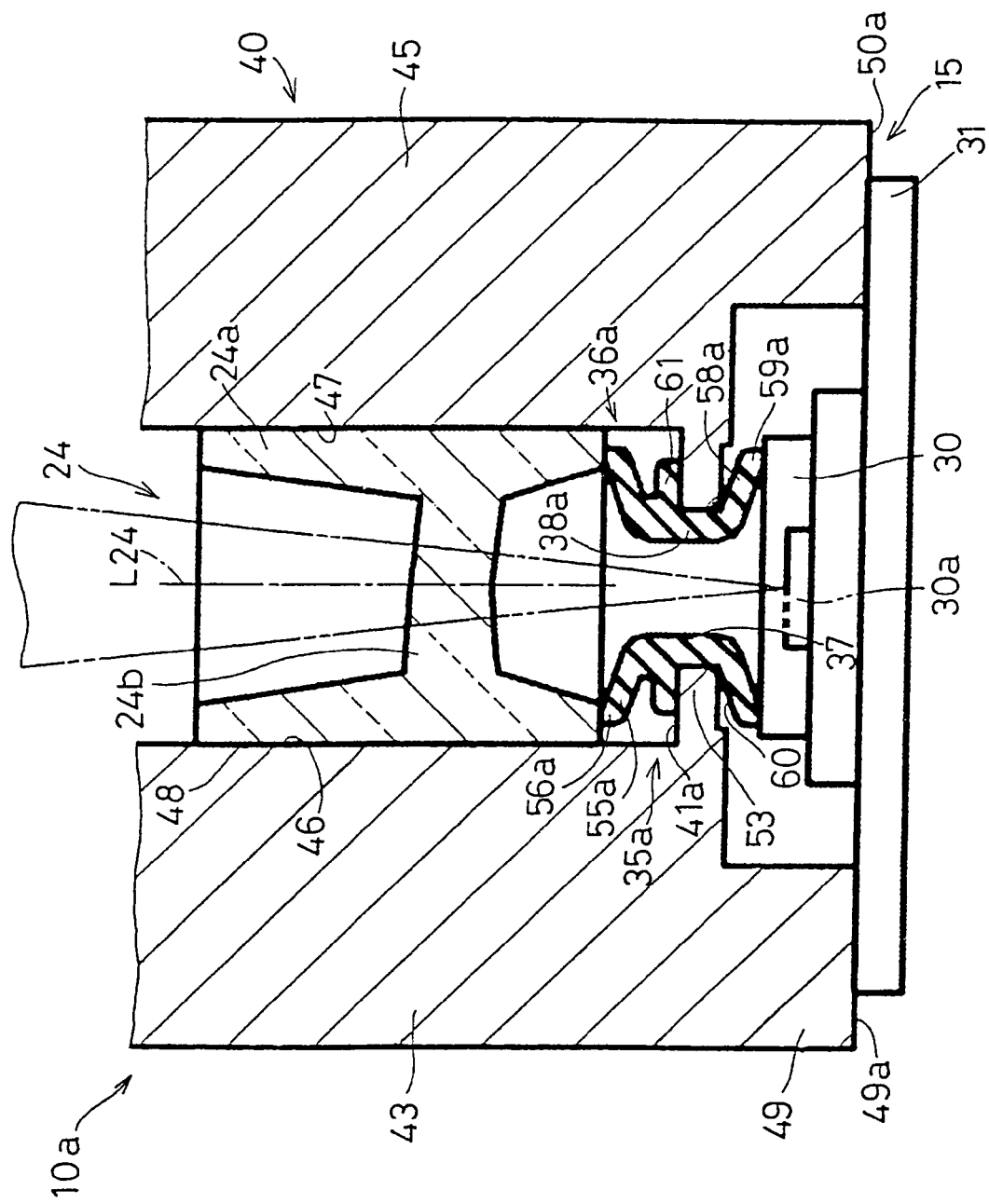
FIG. 5 is a cross section showing a part of the housing of an optical pickup device in a second embodiment of the invention.

FIG. 5 is a cross section showing a part of the housing 40 of an optical pickup device 10a in a second embodiment of the invention. The optical pickup device 10a of the embodiment is similar to the optical pickup device 10 of the first embodiment shown in FIGS. 1 to 4, so that only the different points will be described. In the optical pickup device 10a of the second embodiment, components similar to those of the optical pickup device 10 of the first embodiment are designated by the same reference numerals. In the optical pickup device 10a of the second embodiment, in place of the dustproof member 35 of the optical pickup device 10 of the first embodiment, a dustproof member 35a of which inner peripheral face 37 and outer peripheral face 60 expand toward both the ends 36a in the axial direction is provided. In the example of FIG. 5, both the ends 36a in the axial direction of the dustproof member 35a are formed in a cone shape in which the inner peripheral face 37 and the outer peripheral face 60 expand toward both the ends 36a in the axial direction.

A lens contact portion 56a of a one end portion 55a of the dustproof member 35a is in elastic contact with the spot adjustment lens 24. When the spot adjustment lens 24 is displaced in the first lens adjustment direction A1, the one end portion 55a of the dustproof member 35a is deformed in the axial direction so as to further expand. When the spot adjustment lens 24 is displaced in the second lens adjustment direction A2, the one end portion 55a of the dustproof member 35a is deformed in the axial direction so as to be reset to a natural state where no external force is applied. By forming the one end portion 55a of the dustproof member 35a in a cone shape in which the inner peripheral face 37 and the outer peripheral face 60 expand toward the one end portion 55a, for example, as compared with a dustproof member having a right cylindrical shape, the one end portion 55a in the axial direction can be deformed in the axial direction more easily.

A device contact portion 59a of the other end portion 58a of the dustproof member 35a is in elastic contact with the light sensing device 30. Since the inner peripheral face 37 and the outer peripheral face 60 of the other end portion 58a of the dustproof member 35a expand toward the other end portion 58a, the other end portion 58a can be deformed in the axial direction more easily as compared with a dustproof member having, for example, a right circular cylinder shape. For example, in the case where the light sensing device 30 is provided in the housing 40 in a state where it is pressed against the dustproof member 35a, the other end portion 58a of the dustproof member 35a is deformed so as to further expand and can be elastically in contact with the light sensing device 30.

Further, in the intermediate portion 38a in the axial direction of the dustproof member 35a, an annular projection piece 61 which projects toward the outside in the radial direction is provided in the whole periphery of the cylindrical portion of the right circular cylindrical shape. The projection piece 61 is provided near to the one end portion 55a in the intermediate portion 38a in the axial direction of the dustproof member 35a. In a state where the dustproof member 35a is provided for the partition wall 41, the full periphery of the projection piece 61 is in elastic contact with the surface 41a facing the dustproof member 35a of the partition wall 41. The projection piece 61 prevents deviation of the dustproof member 35a with respect to the housing 40 and deformation of the inner peripheral face in the intermediate portion 38a in the axial direction due to displacement of the spot adjustment lens 24 and the light sensing device 30.

Further, the portion between the projection piece 61 of the dustproof member 35a and the one end portion 55a has a shape which is recessed in the radial direction as compared with the dustproof member 35 in the first embodiment. In other words, the portion sandwiched between the spot adjustment lens 24 of the dustproof member 35a and the partition wall 41 is formed thinner as compared with that of the dustproof member 35 in the first embodiment. With the configuration, in a state where only the one end portion 55a of the dustproof member 35a is more easily deformed in the axial direction, the dustproof member 35a is held on the partition wall 41 by the projection piece 61 without being deviated. When the spot adjustment lens 24 is displaced in the first lens adjustment direction A1, by the projection piece 61, the dustproof member 35a can be prevented from being displaced toward the light sensing device 30 and come off from the inner peripheral portion 53 of the partition wall 41.

In the embodiment, the dustproof member 35a expands towards both the ends 36a in the axial direction, as compared with a dustproof member of which both the ends in the axial direction are not deformed in the axial direction, the dustproof member 35a can be deformed in the axial direction more easily. By providing the dustproof member 35a with the projection piece 61, even in the case where an external force in the axial direction is applied to the dustproof member 35a, the dustproof member 35a can be deformed in the axial direction more easily. With the configuration, the dustproof member 35a can be prevented from exerting an adverse influence on the optical path 29 by, for example, interrupting the optical path 29 due to deformation of the inner peripheral face 37 of the dustproof member 35a.

THIRD EMBODIMENT

Figure 6:
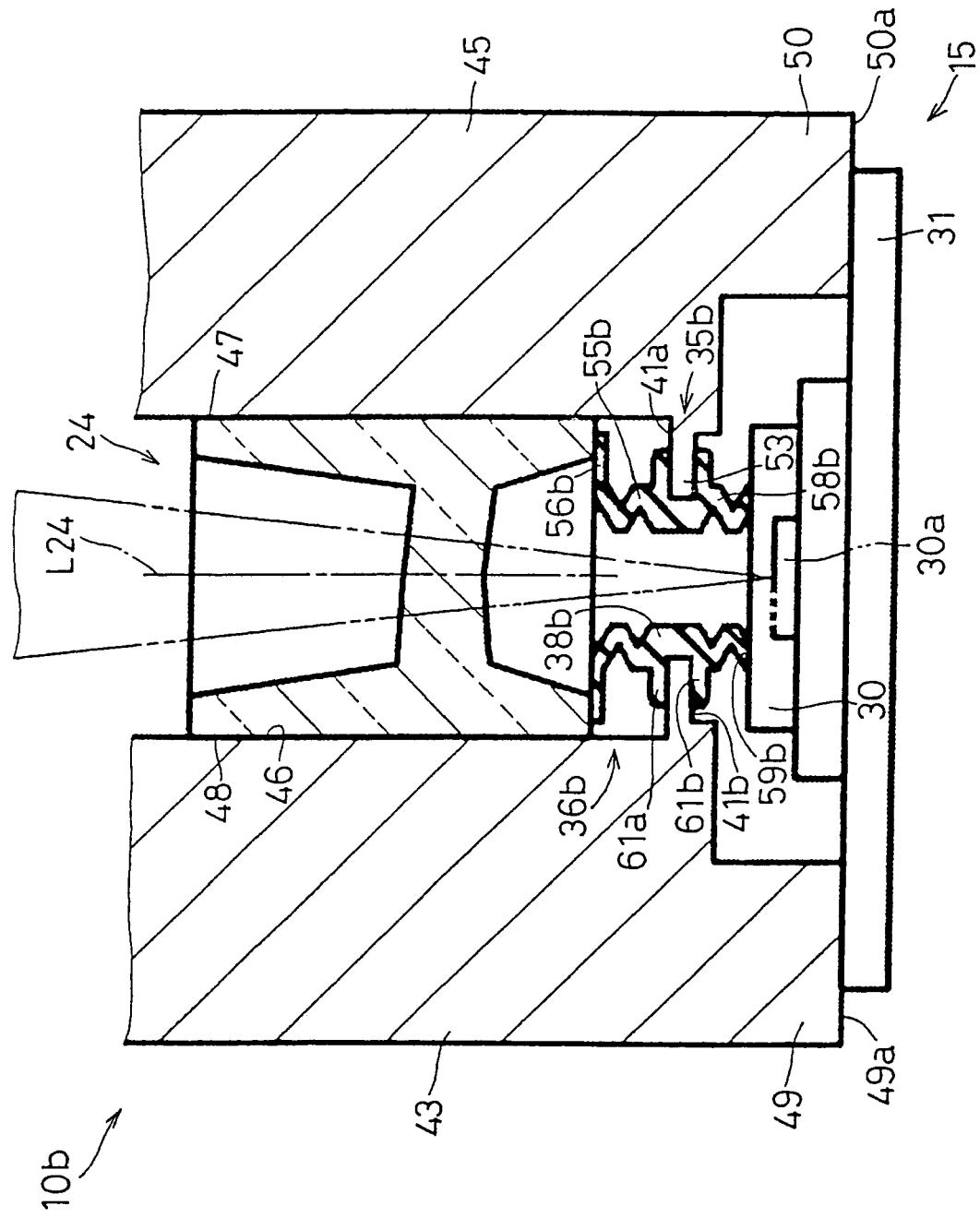
FIG. 6 is a cross section showing a part of the housing of an optical pickup device of a third embodiment of the invention.

FIG. 6 is a cross section showing a part of the housing 40 of an optical pickup device 10b of a third embodiment of the invention. The optical pickup device 10b of the third embodiment is similar to the optical pickup device 10 of the first embodiment, so that only different points will be described. In the optical pickup device 10b of the third embodiment, components similar to those of the optical pickup device 10 of the first embodiment are designated by the same reference numerals. In the optical pickup device 10b of the third embodiment, in place of the dustproof member 35 of the optical pickup device 10 of the first embodiment, a dustproof member 35b which is formed in a bellows shape is provided. In the example of FIG. 6, each of one end portion 55b and the other end portion 58b of the dustproof member 35b is formed in a bellows shape. In a portion having a lens contact portion 56b of the one end portion 55b of the dustproof member 35b, the inner peripheral face 37 and the outer peripheral face 60 expand toward the one end portion 55b more greatly than the portion expands in the one end portion 55b. The configuration prevents a situation such that, when the spot adjustment lens 24 is displaced in the first and second lens adjustment directions A1 and A2, the lens contact portion 56b enters an inner space surrounded by the cylindrical body 24a of the spot adjustment lens 24 and the state of contact with the spot adjustment lens 24 is erroneously canceled. Therefore, the state of contact between the lens contact portion 56b and the spot adjustment lens 24 is held with reliability.

In the intermediate portion 38b in the axial direction of the dustproof member 35b, two annular-shaped projection pieces 61a and 61b which are disposed with a spacing in the axial direction and project to the outside in the radial direction are provided around of the cylindrical portion of the right circular cylindrical shape. In a state where the dustproof member 35b is provided for the partition wall 41, the projection piece 61a as one of the two projection pieces 61a and 61b is provided near to the one end portion 55b of the dustproof member 35b and is in elastic contact with the surface 41a facing the spot adjustment lens 24 of the partition wall 41. The other projection piece 61b is provided near to the other end portion 58b of the dustproof member 35b and is in elastic contact with the other surface 41b facing the light sensing device 30 of the partition wall 41. The partition wall 41 is sandwiched by the two projection pieces 61a and 61b from both sides in the thickness direction. The two projection pieces 61a and 61b prevent deviation in an axis line of the dustproof member 35a with respect to the housing 40 and deformation of the inner peripheral face in the intermediate portion 38b in the axial direction due to displacement of the spot adjustment lens 24 and the light sensing device 30.

Further, the portion sandwiched by the spot adjustment lens 24 and the partition wall 41 in the dustproof member 35b is formed to be thinner as compared with that in the dustproof member 35 in the first embodiment. When the spot adjustment lens 24 is displaced, in a state where only the one end portion 55b of the dustproof member 35b is made more easily deformed in the axial direction, the dustproof member 35b is held in the partition wall 41 by the two projection pieces 61a and 61b without being positionally deviated. Even in the case where an external force in the axial directions is applied to the dustproof member 35b, the two projection pieces 61a and 61b can prevent the dustproof member 35b from being come off from the inner peripheral portion 53 of the partition wall 41.

According to the embodiment, since the dustproof member 35b is formed in a bellows shape, as compared with a dustproof member of which both the ends in the axial direction are not deformed in the axial direction, the dustproof member 35b can be deformed more easily in the axial direction. Even in the case where an external force in the axial direction is applied to the dustproof member 35b, the dustproof member 35b is deformed in the axial direction, so that the dustproof member 35b can be prevented from exerting an adverse influence on the optical path.

FOURTH EMBODIMENT

Figure 7:
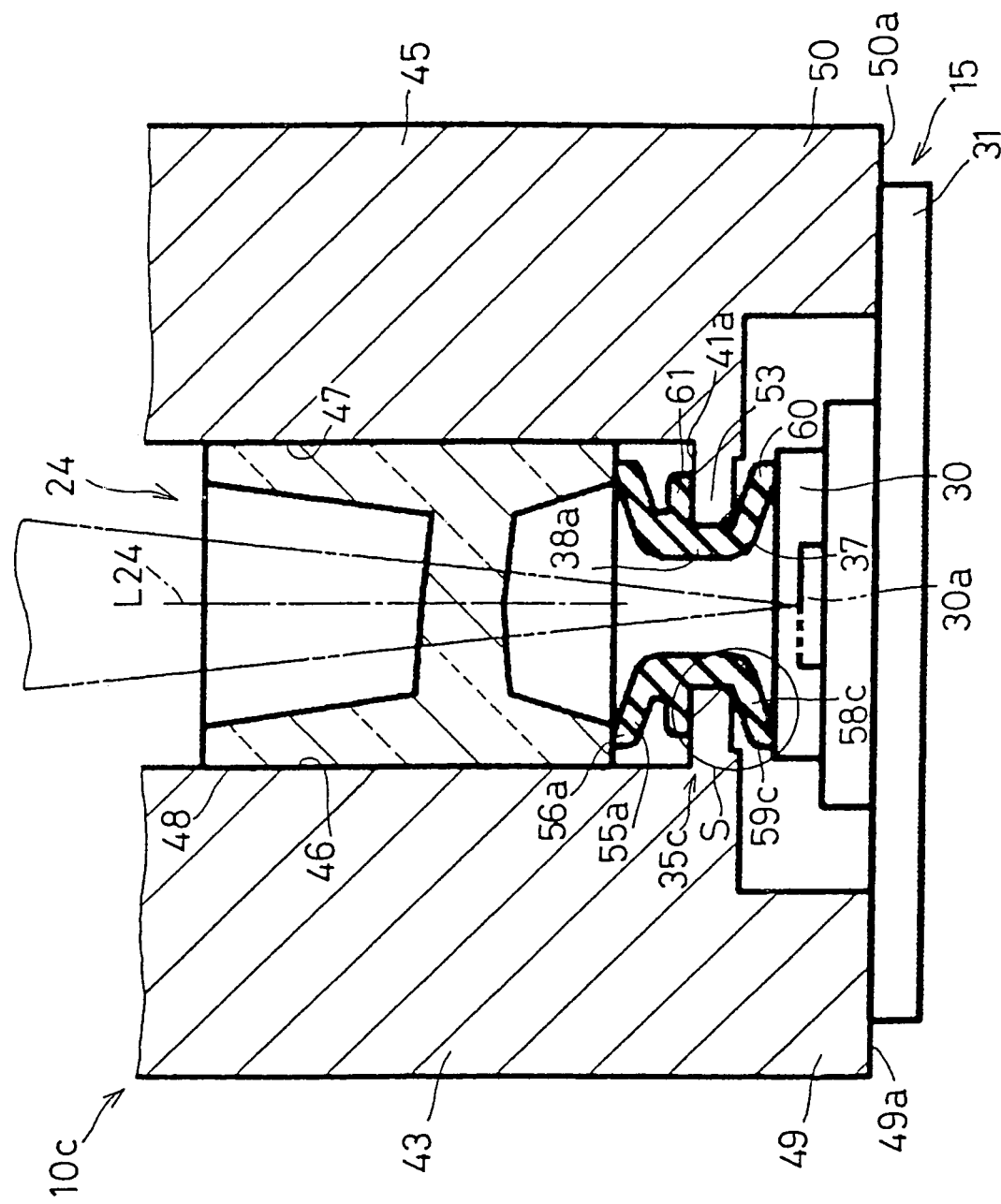
FIG. 7 is a cross section showing a part of the housing of an optical pickup device in a fourth embodiment of the invention.
Figure 8:
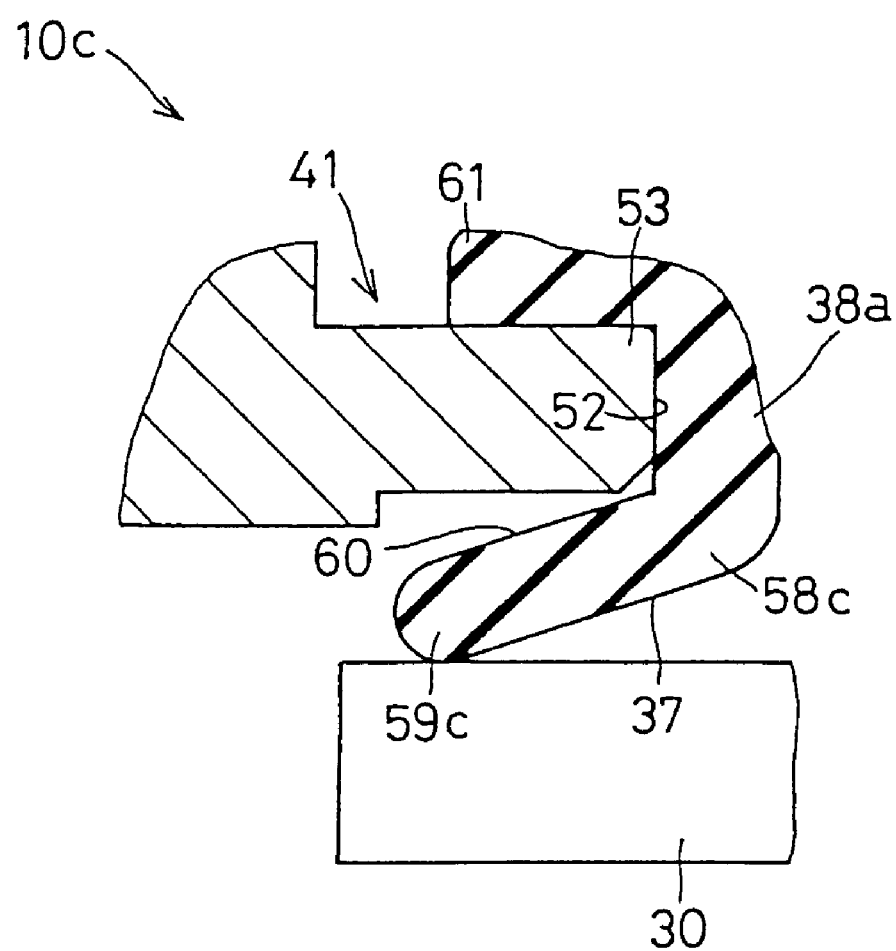
FIG. 8 is an enlarged cross section of a section S in FIG. 7.

FIG. 7 is a cross section showing a part of the housing 40 of an optical pickup device 10c in a fourth embodiment of the invention. FIG. 8 is an enlarged cross section of a section S in FIG. 7. The optical pickup device 10c of the fourth embodiment is similar to the optical pickup device 10a of the second embodiment shown in FIG. 5 and only different points will be described. In the optical pickup device 10c of the fourth embodiment, components similar to those of the optical pickup device 10a of the second embodiment are designated by the same reference numerals. In the optical pickup device 10c of the fourth embodiment, in the dustproof member 35c, at least the surface of a device contact portion 59c which is in elastic contact with the light sensing device 30 is formed as a curved surface. In the fourth embodiment, the surface of the lens contact portion 56a of the dustproof member 35c is not formed as a curved surface but the surface of the device contact portion 59c of the dustproof member 35c is formed as a curved surface. As compared with the case where the surface of the device contact portion is a plane, the contact area between the dustproof member 35c and the light sensing device 30 is smaller, and a frictional force generated by the displacement of the light sensing device 30 decreases. In the case where the light sensing device 30 is rotated around the reference axis line L15 and in the case where the light sensing device 30 is displaced in the first and second adjustment directions B1 and B2, the influence exerted by displacement of the light sensing device 30 can be reduced. Therefore, the other end portion 58c of the dustproof member 35c can be prevented from easily rotating around the reference axis line L15 and from being easily deformed in the first and second adjustment directions B1 and B2.

According to the fourth embodiment, the dustproof member 35c is formed in such a manner that at least the surface of the device contact portion 59c which is in contact with the light sensing device 30 is formed as a curved surface. As compared with the case where the surface of the device contact portion 59c is a plane, the contact area between the dustproof member 35c and the light sensing device 30 can be made smaller. Therefore, an influence exerted by displacement of the light sensing device 30 can be reduced so as not to be easily exerted. For example, in the case of displacing the light sensing device 30 along a virtual plane perpendicular to the optical axis L24 of the spot adjustment lens 24, as compared with the case of displacing the light sensing device 30 in the direction parallel to the optical axis L24, the dustproof member 35c exerts an influence on the optical path due to a displacement of the light sensing device 30 more easily. However, by forming the surface of the device contact portion 59c of the dustproof member 35c as a curved surface, an influence exerted on the optical path due to displacement (the first and second adjustment directions B1 and B2 )of the light sensing device 30 can be reduced with reliability. The dustproof member 35c can be also prevented from damaging the light sensing device 30.

In the embodiment, only the surface of the device contact portion 59c of the dustproof member 35 is formed as a curved surface. In addition, the surface of the contact portion 56a which is in contact with the spot adjustment lens 24 may be also formed as a curved surface.

The foregoing first to fourth embodiments are just examples of the invention and the configurations can be changed within the scope of the invention. For example, the dustproof member may be disposed between other parts of an optical system, for example, in an optical path extending between the light source 12 and the grating lens 20, in an optical path extending between the beam splitter 21 and the spot adjustment lens 24, and the like. The surface of each of the lens contact portion and the device contact portion of the dustproof member in the first and third embodiments may be formed as a curved surface. The dustproof member may be formed in such a manner that only the inner peripheral surface is black and the other portion is a color other than black. The optical pickup device may have the function of recording/reproducing information to/from an optical recording medium and, in addition, the function of erasing information from the optical recording medium.

FIFTH EMBODIMENT

Figure 9:
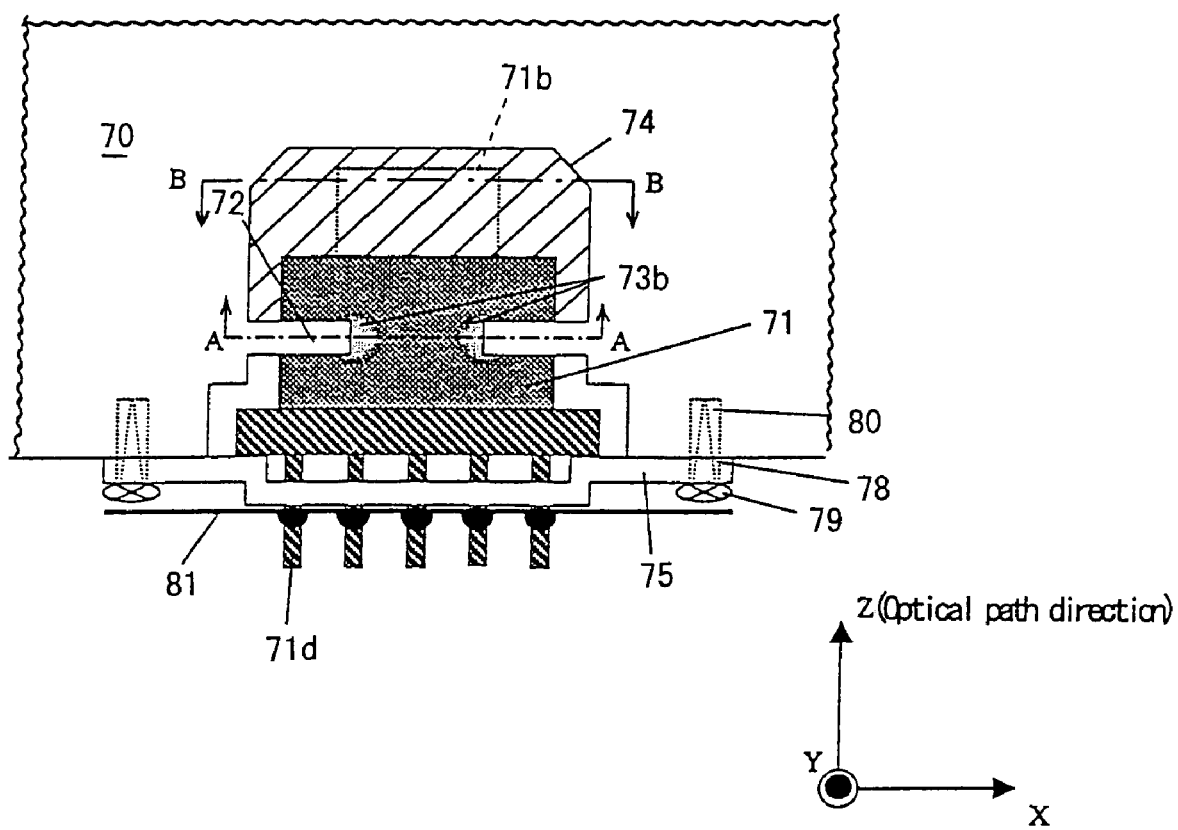
FIG. 9 is a plan view of a main portion of an optical pickup device of a fifth embodiment of the invention.
Figure 10:
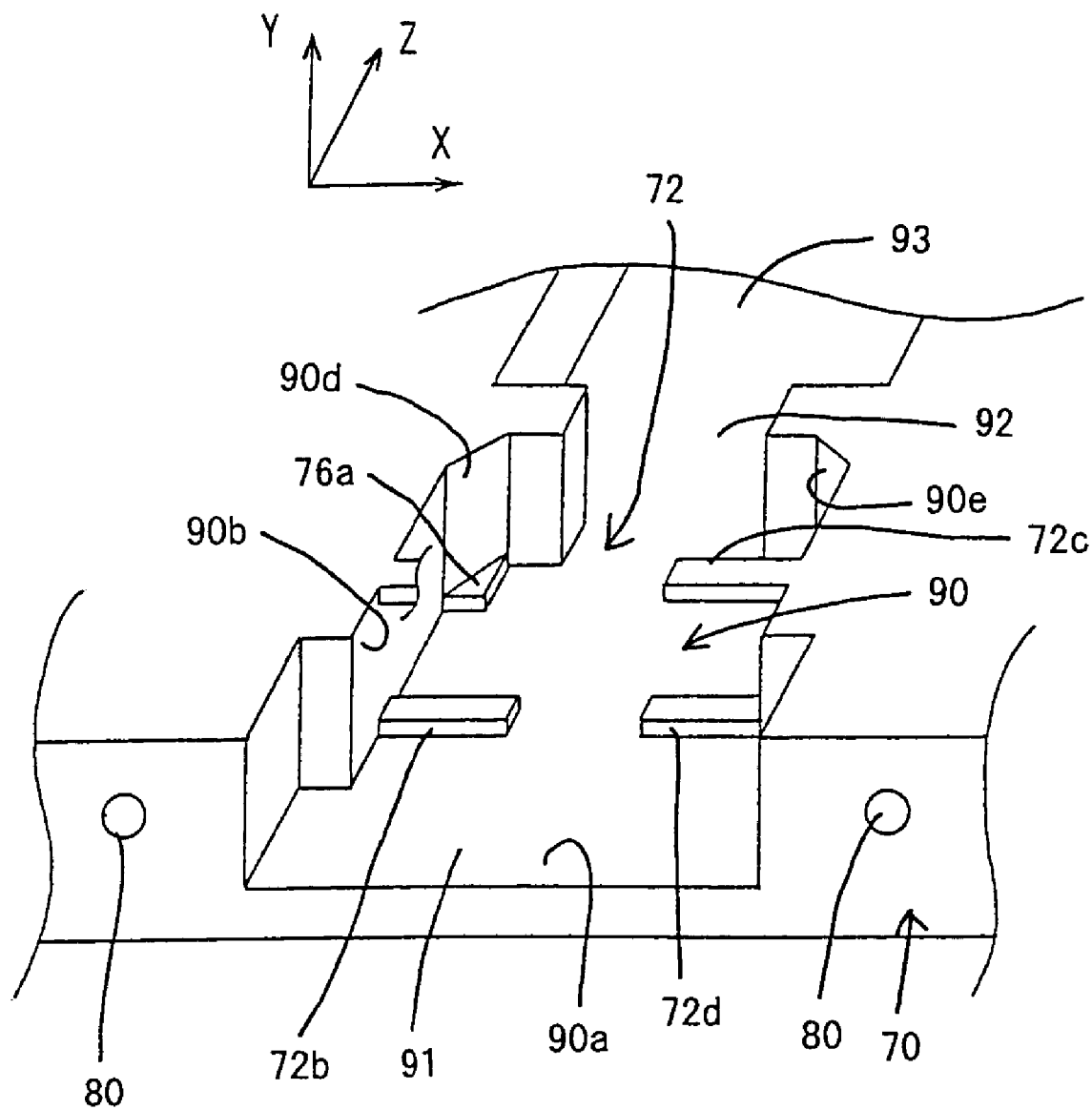
FIG. 10 is a perspective view of a main portion of the housing in the fifth embodiment.
Figure 11:
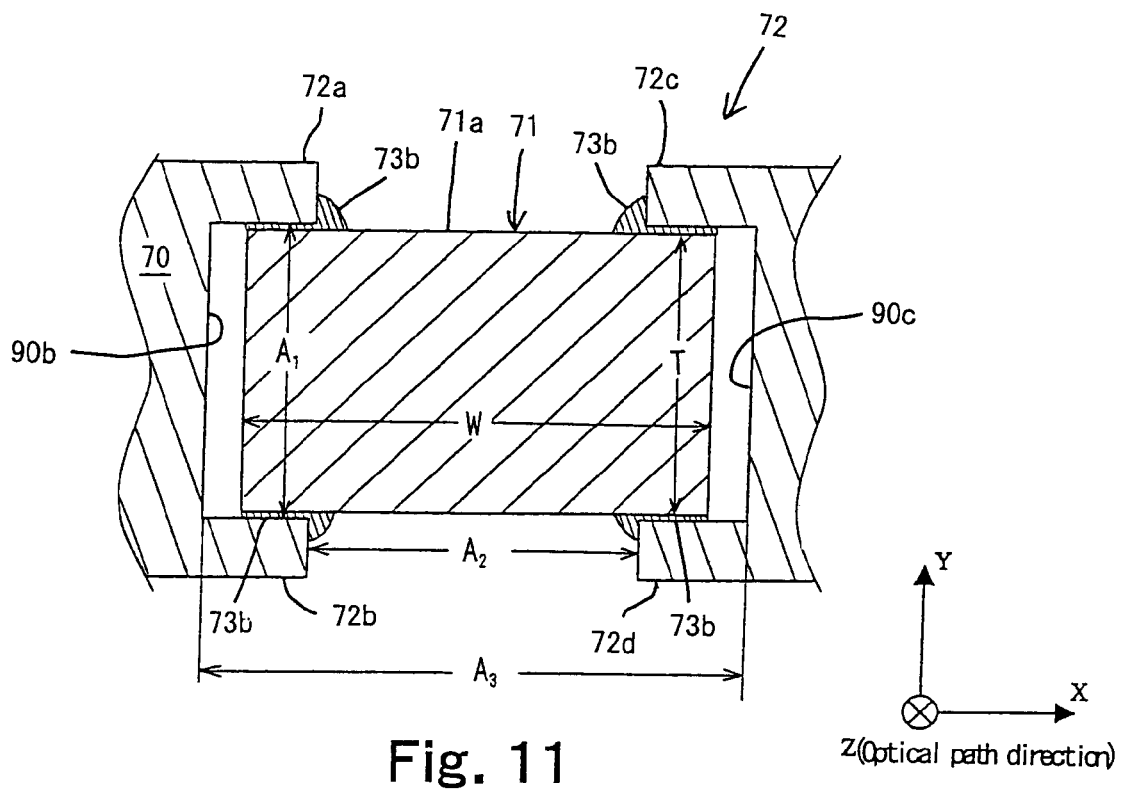
FIG. 11 is a cross section taken along line A-A of FIG. 9.
Figure 12:
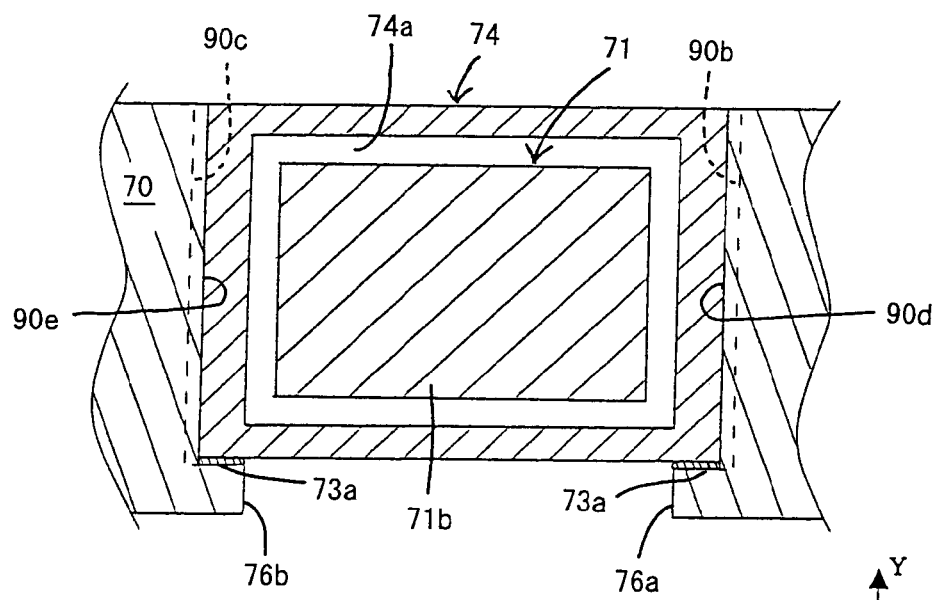
FIG. 12 is a cross section taken along line B-B of FIG. 9.
Figure 13:
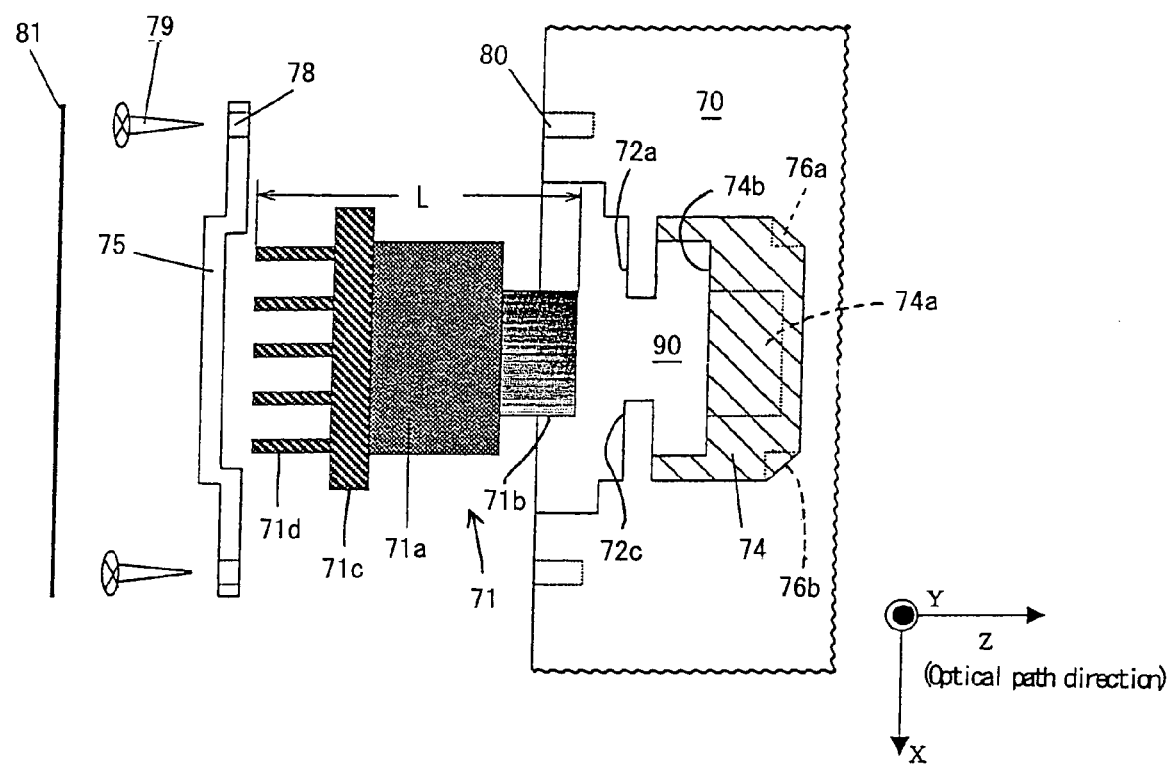
FIG. 13 is a plan view of parts exploded from the optical pickup device in the fifth embodiment.
Figure 14:
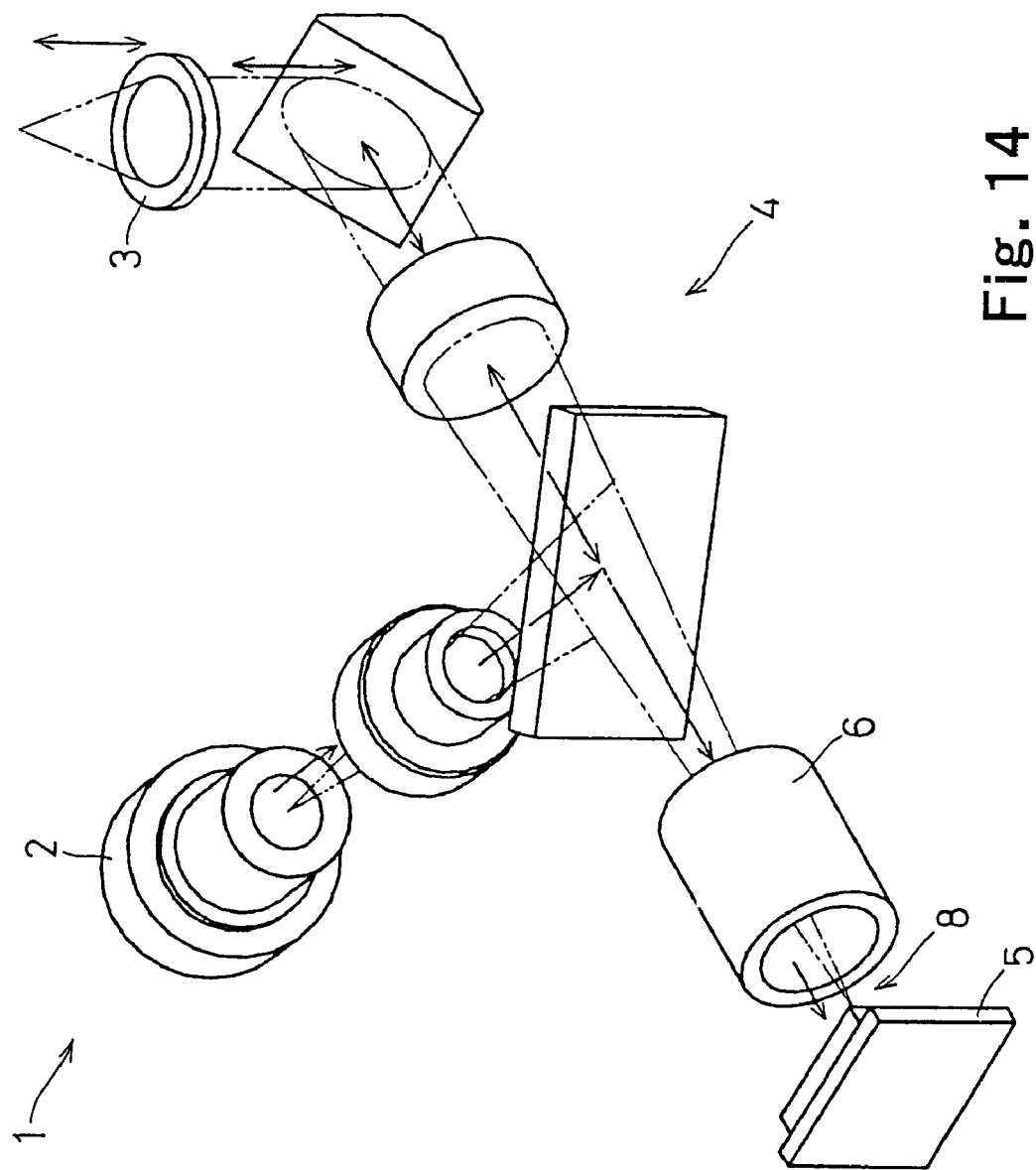
FIG. 14 is a perspective view showing an optical pickup device of Prior Art 1.
Figure 15:
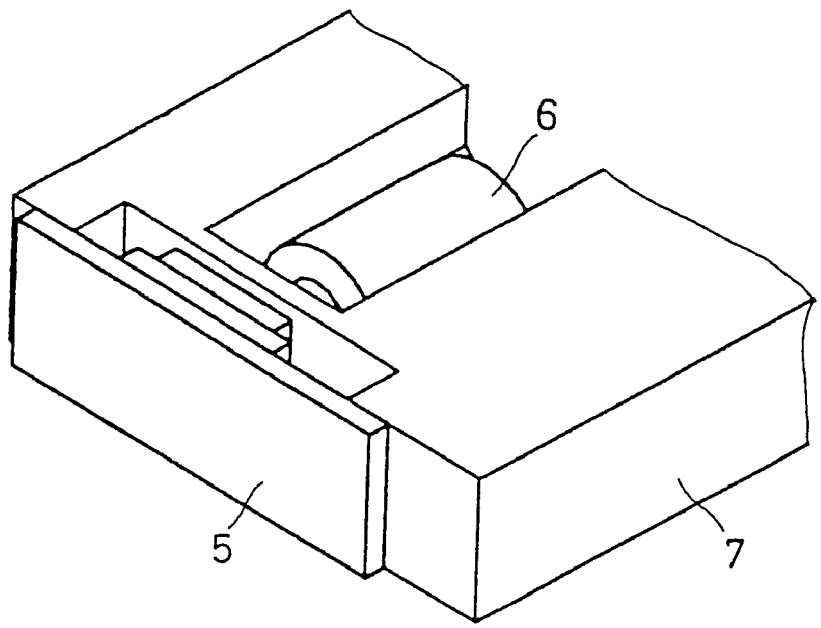
FIG. 15 is a perspective view showing a part of a housing in which a light sensing device and an opposed lens in Prior Art 1 are provided.
Figure 16:
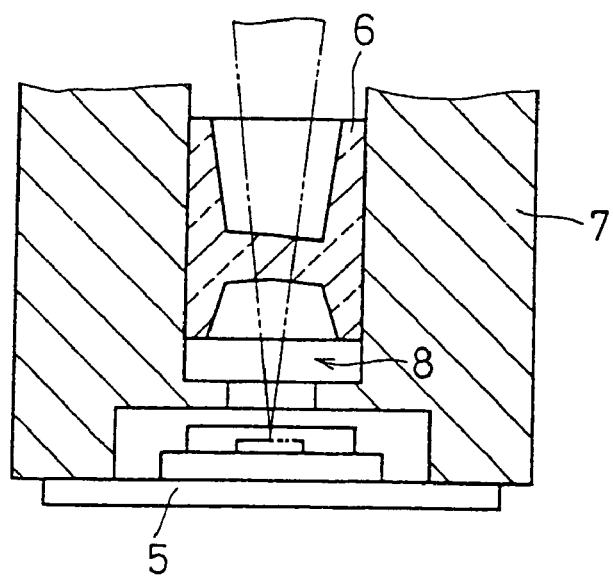
FIG. 16 is a cross section showing a part of the housing in Prior Art 1.
Figure 17:
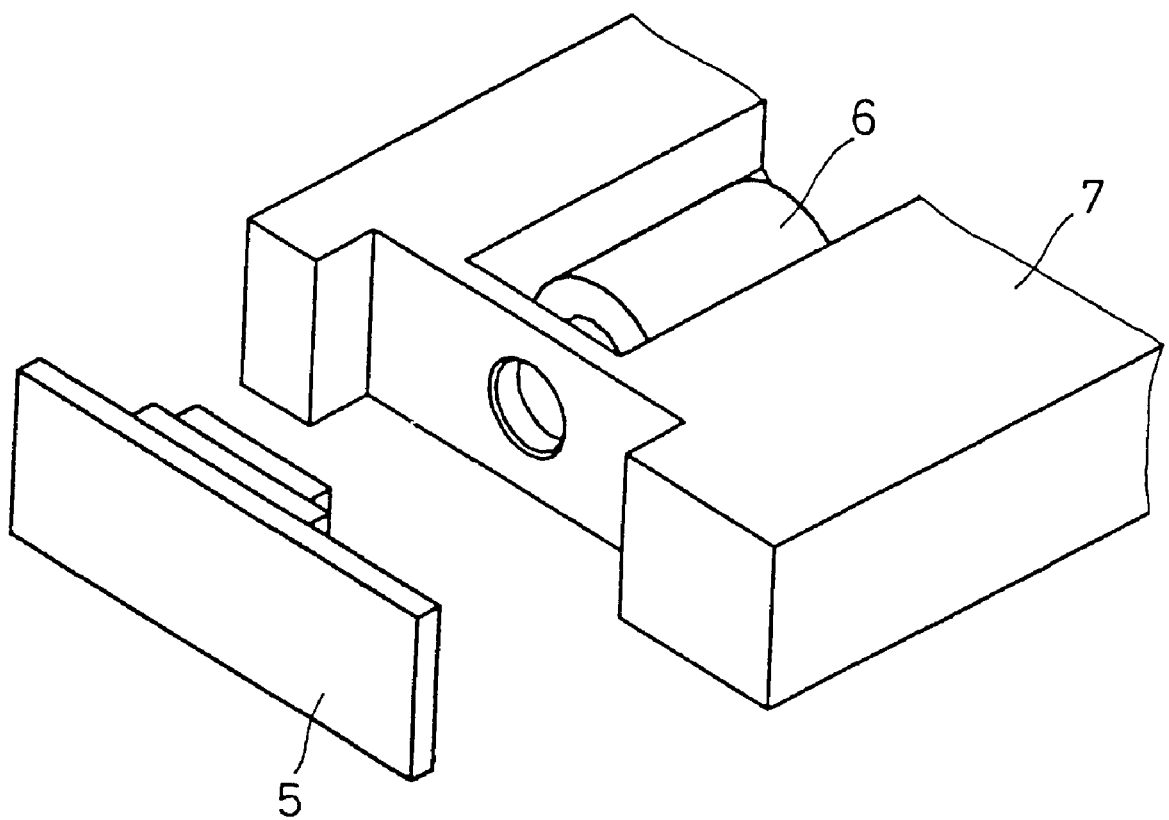
FIG. 17 is a perspective view showing a part of the housing before the light sensing device is provided in Prior Art 1.

FIG. 9 is a plan view of a main portion of an optical pickup device of a fifth embodiment of the invention. FIG. 10 is a perspective view of a main portion of the housing in the fifth embodiment. FIG. 11 is a cross section taken along line A-A of FIG. 9. FIG. 12 is a cross section taken along line B-B of FIG. 9. FIG. 13 is a plan view of parts exploded from the optical pickup device in the fifth embodiment. In FIGS. 9 to 13, the same components as those of the conventional optical pickup device in FIG. 18 are designated by the same reference numerals.

The optical pickup device has the housing 70 and various optical parts attached to the housing 70. The various optical parts include the hologram laser unit 71 capable of emitting and detecting a laser beam, and a dichromatic prism, a collimator lens, a reflection mirror, and an objective lens which are not shown.

The optical pickup device of the invention is characterized by an attaching structure that an optical part including a light source for emitting a laser beam and/or a light sensing device capable of detecting the laser beam like the hologram laser unit 71 is attached to the housing 70.

The hologram laser unit 71 used in the embodiment will be described briefly. The laser unit 71 is a conventionally generally used one and has a body portion 71a of a rectangular block shape, the diffraction device 71b attached to the tip of the body portion 71a, and a plurality of terminals 71d provided at the base end of the body portion 71a via a joint plate 71c. The hologram laser unit 71 has dimensions such that overall length L (Z direction): 10.6 mm, width W (X direction) of the body portion 71a: 6.6 mm, and thickness T (Y direction) of the body portion 71a: 3.0 mm.

The structure of attaching the hologram laser unit 71 to the housing 70 will be described hereinbelow.

The housing 70 has, in a part of the periphery, a recess 90 for attaching an optical part, to which the hologram laser unit 71 is inserted in the horizontal direction and attached and, on both sides of the recess 90 in the peripheral end face, screw holes 80, 80 for attaching the hologram laser unit 71 to the recess 90.

The recess 90 for attaching an optical part is a recessed groove which opens in the horizontal direction (Z direction) and upward. The opening in the horizontal direction is an insertion port 91 to which the hologram laser unit 71 is inserted. In the deep portion of the recess 90, a groove-shaped optical path 92 is formed in the optical path length direction (Z direction). The optical path 92 is communicated with a recessed portion 93 for housing a not-shown dichroic prism, a collimator lens, or the like. Further, the recess 90 has a step on each of the right and left inner side faces, which is narrowed in a position to the depth side a little from the insertion port 91. On the side deeper than the step, a temporary holding portion 72 is provided, which regulates movement of the hologram laser unit 71 in the vertical direction (Y direction) perpendicular to the bottom face 90a of the recess 90 so as to be able to temporary hold the hologram laser unit 71 for position adjustment of the hologram laser unit 71 at least in the optical path length direction.

The temporary holding portion 72 is constructed by a pair of upper and lower projection pieces 72a and 72b which project to the inside from a left inner face 90b and a pair of upper and lower projection pieces 72c and 72d which project to the inside from a right inner face 90c toward the insertion port 91 of the recess 90 which is open in the horizontal direction in an almost intermediate position in the optical path length direction (Z direction) of the recess 90. The under face of each of the projection pieces 72a and 72c on the upper side and the top face of each of the projection pieces 72b and 72d on the lower side are formed as opposed faces parallel to each other in the horizontal direction. In this case, the top face of each of the upper projection pieces 72a and 72c is flush with the top face of the housing 70. The projection pieces 72b and 72d on the lower side are formed on the bottom face 90a of the recess 90.

The interval $A_1$ between the projection pieces 72a and 72c on the upper side and the projection pieces 72b and 72d on the lower side is set almost equal to the thickness T of the hologram laser unit 71. The interval $A_2$ between the projection pieces 72a and 72b on the left side and the projection pieces 72c and 72d on the right side is set to be smaller than the width W of the hologram laser unit 71. In the case of the embodiment, the interval $A_1$ is set to be about 3.0 mm and the interval $A_2$ is set to be smaller than 6.6 mm. The interval $A_3$ between the left inner face 90b and the right inner face 90c is set to be larger than 6.6 mm. Each of the projection pieces 72a, 72b, 72c, and 72d is formed in a square bar having a length (X direction) of 2.3 mm, a width (Z direction) of 1.8 mm, and a thickness (Y direction) of 0.8 mm. The interval $A_1$ and the thickness of the projection pieces 72*b* and 72*d* on the lower side are set so that the laser unit 71 is temporarily held to make the optical axis of the laser unit 71 parallel to the designed optical axis and coincide with the height of the designed optical axis by inserting the laser unit 71 in a space consisting of the projection pieces 72*a*, 72*b*, 72*c*, and 72*d*. The projection pieces 72*a*, 72*b*, 72*c*, and 72*d* also serve as portions to which an adhesive is applied for fixing the position of the laser unit 71. This will be described later.

Between the left and right inner faces 90*b* and 90*c* and the deep wall face in the recess 90, bent wall faces 90*d* and 90*e* by which the width is narrowed toward the deep side are provided. In positions in contact with the bent wall faces 90*d* and 90*e* in the bottom face 90*a*, a pair of attachment steps (protrusion) 76*a* and 76*b* having an isosceles triangle shape for attaching the elastic buffer 74 which will be described later are provided. In the case of the embodiment, each of the attachment steps 76*a* and 76*b* is set to have a hypotenuse of 2.1 mm, the other side of 1.5 mm, and a thickness of 0.8 mm. The attachment steps 76*a* and 76*b* are used as portions to which an adhesive is applied for adhering the elastic buffer 74 to the recess 90 and are set to have the thickness so as to hold the elastic buffer 74 in a predetermined height position.

The optical pickup device of the invention has the elastic buffer 74 attached to the deep portion of the recess 90. The elastic buffer 74 takes the form of a black sponge made of plastic having an arbitrary elasticity and is formed in an outer shape almost the same as the space deeper than the projection 72 in the recess 90. The elastic buffer 74 has therein a housing recess 74*a* having a size in which the whole diffraction device 71*b* of the hologram laser unit 71 can be inserted with a margin and has, on the opening side (projection 72 side) of the housing recess 74*a*, a fitting recess 74*b* in which the front end side of the body 71*a* is fit. In the front end face of the elastic buffer 74, a laser beam passing window (not shown) communicated with the housing recess 74*a* is formed. At the time of attaching the elastic buffer 74 to the deep portion of the recess 90, an adhesive 73*a* is preliminarily applied to the top face of the pair of attachment steps 76*a* and 76*b*, the elastic buffer 74 is inserted from the upper opening of the recess 90, and two portions in the under face are fixed by the adhesive 73*a*.

An example of the procedure (assembling method) of attaching the hologram laser unit 71 to an attachment structure provided for the housing 70 will now be described.

In the housing 70, the elastic buffer 74 is preliminarily attached to the recess 90 as described above.

Process (1)

The laser unit 71 is inserted from the diffraction device 71*b* side into the insertion port 91 of the housing 70 and the diffraction device 71*b* is inserted in the housing recess 74*a* in the elastic buffer 74. At this time, even if the laser unit 71 is excessively pushed into the recess 90, the elastic buffer 74 plays the role of a cushion to prevent the diffraction device 71*b* from coming into direct contact with the inner face of the recess 90 and from being destroyed. When the diffraction device 71*b* is housed in the housing recess 74*a* in the elastic buffer 74, a dustproof effect and a light shielding effect are obtained and, accordingly, a higher pickup precision is obtained. On the other hand, the tip portion of the body 71*a* is fit in the fitting recess 74*b* in the elastic buffer 74 and the intermediate portion is inserted between the projection pieces 72*a* and 72*c* on the upper side and the projection pieces 72*b* and 72*d* on the lower side. The laser unit 71 is temporarily held (sandwiched) in a state where movement in the vertical direction (Y direction) is regulated.

Process (2)

The position of the laser unit 71 temporarily held by the projections 72 is adjusted in the optical path length direction (Z direction) and the horizontal direction (X direction) by using, for example, a position adjusting tool. Since the elastic buffer 74 is a sponge having moderate elasticity, while pushing the diffraction device 71*b* as a device at the tip of the laser unit 71 against the elastic buffer 74, the diffraction device 71*b* can be slightly moved easily in the optical path length direction without coming into contact with the wall face in the deep portion of the recess 90. The position adjustment in the vertical direction (Y direction) of the laser unit 71 is performed by temporary holding the laser unit 71 by the projections 72.

Process (3)

An adhesive (preferably, an instantaneous adhesive of which hardening time is extremely short) is applied to a contact portion between the projection pieces 72*a* and 72*c* on the upper side and the top face of the body 71*a* of the laser unit 71 and a contact portion between the projection pieces 72*b* and 72*d* on the lower side and the under face of the body 71*a* of the laser unit 71, concretely, a portion in which a vertical face of each of the projection pieces and the contact face of the laser unit 71 are in contact with each other, thereby fixing the laser unit 71 to the projections 72.

Process (4)

The terminals 71*d* of the laser unit 71 are inserted in a plurality of terminal insertion holes of the laser pressing spring 75, the screws 79 are inserted in the holes 78 formed in both the ends of the laser pressing spring 74, and the screws 79 are screwed in the screw holes 80 formed in the housing 70. By inserting the terminals 71*d* in a plurality of holes in the FPC 81 and soldering the conductive lands around the holes and the terminals 71*a*, the laser unit 71 is securely fixed in a state where the position of the laser unit 71 is adjusted at high precision with respect to the housing 70.

As described above, the invention has advantages that the space adjustment in the optical path direction of the laser unit 71 is enabled and, in addition, the laser holder (refer to FIG. 18) which is required conventionally and is not easily processed is unnecessary. The precision of a laser beam emitted to the collimator lens is improved and more-reliable recording to a high-density optical disk medium can be achieved. Damage of the laser unit 71 can be prevented and reduction in fraction defective and cost at the time of manufacturing an optical pickup device can be realized.

OTHER EMBODIMENTS

1. In the foregoing fifth embodiment, as shown in FIG. 10, the case that the recess 90 of the housing 70 has a recessed groove shape having the bottom face 90*a* was described. However, other structures may be also used such that an optical part is inserted in the recess and temporarily held (sandwiched) by projection pieces, positional adjustment is performed, and after that, a window for applying an adhesive is formed around the projection piece on the lower side on the bottom face so that the adhesive can be easily applied to the contact portion between the projection piece on the lower side and the optical part. Alternately, the bottom face may not be provided.
2. In the foregoing fifth embodiment, the case of attaching the hologram laser unit 71 for emitting a laser beam and receiving and detecting the laser beam to the recess 90 in the housing 70 has been described. However, a semiconductor laser for only emitting a laser beam or a light sensing device for only receiving and detecting a laser beam may be attached to the recess 90.

According to the invention, the full periphery of the optical path extending between the opposed lens and the light sensing device is covered with the cylindrical dustproof member. With the configuration, intrusion of the foreign matter such as dusts can be prevented. It can solve the problem such that light from the spot adjustment lens is scattered by the foreign matter and led to the undesired light reception position of the light sensing device. Therefore, the performance of the optical pickup device can be held preferably.

Further, according to the invention, the dustproof member is made of an elastic material. Consequently, even if an external force is applied to the dustproof member, the external force can be absorbed and the position in which the dustproof member is disposed can be prevented from being undesirably deviated. Thus, the state in which the optical path extending between the opposed lens and the light receiving device is covered can be maintained. Further, in the case of providing the dustproof member for the housing or the like, by providing the through hole and a retaining member such as the pair of projection pieces for the housing, without using another holding member such as the adhesive, the dustproof member can be easily provided for the retaining member and held by the housing. Consequently, the workability can be improved and the number of parts of the device can be prevented from increasing.

Further, according to the invention, the one end portion in the axial direction of the dustproof member is elastically in contact with the full periphery of the opposed lens, and the other end portion in the axial direction of the dustproof member is elastically in contact with the full periphery of the light sensing device. Consequently, even in the case where the position is adjusted by displacing the opposed lens and the light sensing device, the dustproof member can be maintained in the contacting state between the opposed lens and the light sensing device. Therefore, intrusion of a foreign matter to the optical path extending between the opposed lens and the light sensing device can be prevented with reliability.

Further, according to the invention, since the dustproof member expands towards both the ends in the axial direction, the dustproof member can be deformed in the axial direction more easily as compared with a dustproof member whose both the ends are not deformed in the axial direction. Even in the case where an external force in the axial direction is applied to the dustproof member, the dustproof member is easily deformed in the axial direction, so that the dustproof member can be prevented from exerting an adverse influence on the optical path.

Further, according to the invention, the dustproof member is formed in a bellows shape. Consequently, as compared with a dustproof member whose both the ends in the axial direction are not deformed in the axial direction, the dustproof member can be deformed in the axial direction more easily. Thus, even in the case where an external force in the axial direction is applied to the dustproof member, the dustproof member is easily deformed in the axial direction, so that the dustproof member can be prevented from exerting an adverse influence on the optical path.

According to the invention, the light sensing device is held by the housing so as to be rotatable around the reference axis line which is parallel to the optical axis of the opposed lens and displaceable in the direction perpendicular to the reference axis line. The opposed lens is held by the housing so as to be displaceable along the optical axis. The dustproof member is held by the housing so that both the ends in the axial direction are displaceable in the intermediate portion in the axial direction. With the configuration, even in the case where the light sensing device and the spot adjustment lens are displaced with respect to the housing, the dustproof member is not easily influenced by the displacement. In other words, even in the case where the light sensing device and the opposed lens are displaced with respect to the housing as described above, the axial layout state of the dustproof member can be maintained. It can prevent a change in the axial layout state of the dustproof member and exertion of an adverse influence on the optical path. Therefore, the dustproof effect can be held with reliability.

According to the invention, the dustproof member is formed in such a manner that at least the surface of a contact portion which is in contact with the light sensing device is formed as a curved surface. As compared with the case where the surface of the contact portion which is in contact with the light sensing device is a plane, the contact area between the dustproof member and the light sensing device can be made smaller. Therefore, an influence exerted by displacement of the light sensing device can be reduced so as not to be easily exerted. For example, in the case of displacing the light sensing device along a virtual plane perpendicular to the optical axis of the spot adjustment lens, as compared with the case of displacing the light sensing device along the optical axis, the dustproof member exerts an influence on the optical path due to a displacement of the light sensing device more easily. However, by forming the surface of the contact portion which is in contact with the light sensing device of the dustproof member as a curved surface, an influence exerted on the optical path due to displacement of the light sensing device can be reduced with reliability. The dustproof member can be also prevented from damaging the light sensing device.

According to the invention, at least the inner peripheral face of the dustproof member is black, so that light can be prevented from being irregularly reflected by the inner peripheral face of the dustproof member. Consequently, stray light generated by irregular reflection can be reliably prevented from being received by the light sensing device.

According to the invention, at the time of attaching the optical part such as the hologram laser unit, the semiconductor laser, the light sensing device, or the like to the housing, by providing the elastic buffer in the attachment position, the light source and/or the light sensing device are/is protected by the elastic buffer. The light source and/or the light sensing device can be prevented from coming into contact with the wall of the housing made of a metal or plastic having a certain degree of strength and from being damaged. As described above, since the optical part is protected by the elastic buffer, the breakage ratio largely decreases, the laser holder which is conventionally necessary becomes unnecessary, a manufacturing process and the number of parts of a laser holder which is not easily processed can be reduced, and attachment of the laser holder to the house and the positional adjustment which are conventionally performed are not performed. Thus, the manufacturing cost is largely reduced and the assembly workability improves.

The adjustment space in the optical path length direction is assured by the elastic buffer, so that the optical part can be (slightly) moved in the optical path length direction by elastic deformation of the elastic buffer at the time of adjusting the position of the optical part in the optical path length direction, and the positional adjustment can be performed easily at high precision. Therefore, the precision of the laser beam (diffusion light) emitted to the collimator lens and/or precision of a laser beam (focused beam) from the collimator lens is improved, and information can be recorded/reproduced to/from a high-density optical device medium more reliably.

What is claimed is:

1. An optical pickup device for recording/reproducing information to/from an optical recording medium, comprising:
   a light source for emitting light;
   a condensing unit for condensing the light from the light source onto an optical recording medium;
   a light receiving unit having a light sensing device for receiving light reflected by the optical recording medium;
   a light leading unit having an opposed lens which faces the light sensing device, for leading the light reflected by the optical recording medium to the light sensing device through the opposed lens; and
   a cylindrical dustproof member for covering the full periphery of an optical path extending between the opposed lens and the light sensing device,
   wherein the dustproof member is made of an elastic material,
   wherein the full periphery of a one end portion in the axial direction of the dustproof member is in elastic contact with the opposed lens, and the full periphery of the other end portion in the axial direction is in elastic contact with the light sensing device, and
   wherein the dustproof member expands toward both ends of the member in the axial direction;
   a housing for holding the light sensing device so as to be rotatable around the reference axis line which is parallel to the optical axis of the opposed lens and so as to be displaceable in the direction perpendicular to the reference axis line, holding the opposed lens so as to be displaceable along the optical axis, and holding the dustproof member so that both the ends in the axial direction are displaceable in the axial direction by the intermediate portion in the axial direction,
   wherein the housing has an optical path which is open without being surrounded, and a partition wall between a light sensing device and opposed lens, said partition wall having a through hole for leading light,
   wherein the dustproof member has a cylindrical shape and a recessed portion which is a partial area recessed toward the inner radius in the whole circumferential direction, and
   wherein an inner peripheral portion of the partition wall is fit in the recessed portion of the dustproof member so that the dustproof member is attached to the housing.

2. The device of claim 1, wherein the dustproof member is formed in a bellows shape.

3. The device of claim 1, wherein at least the surface of a contact portion which is in contact with the light sensing device, of the dustproof member is formed as a curved surface.

4. The device of claim 1, wherein at least the inner peripheral face of the dustproof member is black.

* * * * *

UNITED STATES PATENT AND TRADEMARK OFFICE
CERTIFICATE OF CORRECTION

PATENT NO.         : 7,246,364 B2
APPLICATION NO. : 10/686089
DATED              : July 17, 2007
INVENTOR(S)        : Tatsunori Yamamoto It is certified that error appears in the above-identified patent and that said Letters Patent is hereby corrected as shown below:

On the title page; item [75] under Inventors:

Delete the second inventor "Makoto Akinaga"

Signed and Sealed this

Eleventh Day of November, 2008

JON W. DUDAS
*Director of the United States Patent and Trademark Office*